(12) United States Patent
Tanabe et al.

(10) Patent No.: US 11,662,686 B2
(45) Date of Patent: *May 30, 2023

(54) OLDHAM COUPLING AND IMAGE FORMING APPARATUS

(71) Applicant: CANON KABUSHIKI KAISHA, Tokyo (JP)

(72) Inventors: Yuichi Tanabe, Chiba (JP); Keita Shigihara, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/535,372

(22) Filed: Nov. 24, 2021

(65) Prior Publication Data
US 2022/0187757 A1    Jun. 16, 2022

(30) Foreign Application Priority Data

Dec. 11, 2020  (JP) .............................. JP2020-206318
Oct. 15, 2021  (JP) .............................. JP2021-169591

(51) Int. Cl.
| | |
|---|---|
| G03G 21/18 | (2006.01) |
| G03G 21/16 | (2006.01) |
| G03G 15/00 | (2006.01) |
| F16D 3/04 | (2006.01) |

(52) U.S. Cl.
CPC ............. *G03G 21/186* (2013.01); *F16D 3/04* (2013.01); *G03G 15/757* (2013.01); *G03G 21/1647* (2013.01); *G03G 2221/1657* (2013.01)

(58) Field of Classification Search
CPC ............... G03G 21/186; G03G 15/757; G03G 21/1647; G03G 2221/1657; F16D 3/04
See application file for complete search history.

(56) References Cited

U.S. PATENT DOCUMENTS

| | | | |
|---|---|---|---|
| 10,571,852 B2 | 2/2020 | Tanabe et al. ...... | G03G 21/1619 |
| 2012/0063810 A1* | 3/2012 | Chadani ............... | G03G 21/186 |
| | | | 399/111 |
| 2013/0257233 A1* | 10/2013 | Maeda ...................... | F16D 3/04 |
| | | | 29/428 |
| 2016/0001752 A1 | 1/2016 | Yasui et al. ............. | B60T 8/172 |
| 2022/0187731 A1* | 6/2022 | Shigihara ........... | G03G 15/0258 |

FOREIGN PATENT DOCUMENTS

| | | |
|---|---|---|
| JP | H08-234643 | 9/1996 |
| JP | 2014-177207 | 9/2014 |

* cited by examiner

*Primary Examiner* — Sandra Brase
(74) *Attorney, Agent, or Firm* — Venable LLP

(57) ABSTRACT

An Oldham coupling having play in a rotational direction and being capable of transmitting a driving force. The Oldham coupling includes a developing drive gear as a first hub, a drive coupling as a second hub, and an intermediate member that transmits a driving force between the developing drive gear and the drive coupling. The developing drive gear includes a protruded portion that is fitted to a recessed portion of the intermediate member to transmit a driving force between the developing drive gear and the intermediate member. When seen in a rotational axis direction of the Oldham coupling, the shape of a protruded portion is a substantially rhombic shape.

14 Claims, 16 Drawing Sheets

OLDHAM COUPLING AND IMAGE FORMING APPARATUS

BACKGROUND OF THE INVENTION

Field of the Invention

The present invention relates to an Oldham coupling that transmits drive from a drive source to a unit that is a drive target.

Description of the Related Art

In the related art, a configuration has been used in which drive is to be transmitted from a motor to each unit, which is a drive target, by a drive train using gears and the like. For example, Japanese Patent Application Laid-Open No. 8-234643 describes a configuration in which one motor is used to rotate both a photosensitive drum and a developing sleeve included in a developing unit.

In addition, Japanese Patent Application Laid-Open No. 8-234643 describes a configuration in which the photosensitive drum and the developing sleeve that are a plurality of drive targets are to be selectively rotated. In the configuration of Japanese Patent Application Laid-Open No. 8-234643, in a power transmission mechanism that transmits a driving force from a drive source to the developing sleeve and the photosensitive drum that are drive targets, a coupling having a play of a predetermined rotation angle is provided in a drive train. With such a configuration, a driving force can be selectively transmitted to the drive targets depending on whether the motor rotates forward or the motor rotates reversely.

On the other hand, in the power transmission mechanism that transmits a driving force from the drive source to a unit that is a drive target, a configuration can be considered in which the unit that is a drive target is detachably attached to an apparatus including the drive source. In this case, a rotational axis of the drive source and a rotational axis of a unit side to be detachably attached are likely to be misaligned from each other.

In such a manner, in a configuration in which rotational axes of two rotational shafts are likely to be misaligned from each other, a configuration may be used in which an Oldham coupling is provided to enable a driving force to be transmitted even in a state where the rotational axes of the two rotational shafts are misaligned from each other.

Generally, the Oldham coupling includes a first hub, a second hub, and an intermediate member that transmits a driving force between the first hub and the second hub. Here, as a configuration of the Oldham coupling, when a configuration having a coupling shape of Japanese Patent Application Laid-Open No. 8-234643 is applied to transmit selectively a driving force to the drive targets depending on whether the motor rotates forward or the motor rotates reversely, a driving force cannot be transmitted, which is a concern.

Namely, in two couplings described in Japanese Patent Application Laid-Open No. 8-234643, it is considered that the shape of one thereof represents the first hub and the shape of the other represents the intermediate member. In this case, since the intermediate member is not movable in a radial direction with respect to the first hub, when a rotational axis of a first rotational shaft of a drive source side and a rotational axis of a second rotational shaft of a unit side that is a drive target are misaligned from each other, a driving force cannot be transmitted, which is a concern.

Namely, when a configuration having a play in a rotational direction as in Japanese Patent Application Laid-Open No. 8-234643 is applied, a driving force cannot be transmitted in a state where rotational axes of two rotational shafts are misaligned from each other, and the Oldham coupling does not function.

Therefore, it is desirable to provide an Oldham coupling capable of transmitting a driving force even in a configuration having a play in a rotational direction in view of such a situation.

SUMMARY OF THE INVENTION

A representative configuration for an Oldham coupling according to the present invention configured to achieve the abovementioned purpose includes: a first hub; a second hub; an intermediate member that transmits a driving force between the first hub and the second hub. One of the intermediate member and the first hub includes a first recessed portion formed in an end surface in a rotational axis direction of the Oldham coupling, being recessed in the rotational axis direction, and extending in a first direction orthogonal to the rotational axis direction, and the first recessed portion includes a first inner wall on one side in a second direction orthogonal to the rotational axis direction and to the first direction, and a second inner wall provided on the other side in the second direction and extending parallel to the first inner wall. The other of the intermediate member and the first hub is provided with a protruded portion protruding in the rotational axis direction, being fitted to the first recessed portion, and transmitting a driving force between the intermediate member and the first hub, and the protruded portion includes a first edge portion that comes into contact with the first inner wall in a state the Oldham coupling rotates in a first rotational direction, a second edge portion that comes into contact with the second inner wall in a state the Oldham coupling rotates in the first rotational direction, a third edge portion that comes into contact with the first inner wall in a state the Oldham coupling rotates in a second rotational direction opposite to the first rotational direction, and a fourth edge portion that comes into contact with the second inner wall in a state the Oldham coupling rotates in the second rotational direction opposite to the first rotational direction. In a state the first edge portion is in contact with the first inner wall and the second edge portion is in contact with the second inner wall, the third edge portion is separated from the first inner wall and the fourth edge portion is separated from the second inner wall. In a state the third edge portion is in contact with the first inner wall and the fourth edge portion is in contact with the second inner wall, the first edge portion is separated from the first inner wall and the second edge portion is separated from the second inner wall. In a state the Oldham coupling rotates with rotation of a motor in the second rotational direction, a portion of the first edge portion that is farthest from a first rotation center that is a rotation center of the first hub in the first direction is to be located closer to the second inner wall than the first rotation center in the second direction, and a portion of the second edge portion that is farthest from the first rotation center in the first direction is to be located closer to the first inner wall than the first rotation center in the second direction. In a state the Oldham coupling rotates with rotation of the motor in the first rotational direction, a portion of the third edge portion that is farthest from the first rotation center in the first direction is to be located closer to the second inner wall than the first rotation center in the second direction, and a portion of the fourth edge portion that is farthest from the first rotation center in the first direction is to be located closer to the first inner wall than the first rotation center in the second direction.

Further features of the present invention will become apparent from the following description of exemplary embodiments (with reference to the attached drawings).

DESCRIPTION OF THE EMBODIMENTS

First Embodiment

<Image Forming Apparatus>

Hereinafter, first, an overall configuration of an image forming apparatus including an Oldham coupling according to the present will be described with reference to the drawings, together with an operation at the time of image forming. Unless otherwise specified, the scope of the invention is not intended to be limited to only dimensions, materials, shapes, and relative arrangements of components to be described below.

An image forming apparatus A according to the present embodiment is an intermediate tandem type image forming apparatus that transfers toners of four yellow Y, magenta M, cyan C, and black K colors as developers onto an intermediate transfer belt and then transfers an image onto a sheet to form the image. In the following description, Y, M, C, and K are added, as suffixes, to members using the toners of the above colors, but configurations or operation of the members are substantially the same except that the colors of the toners are different from each other, so that the suffixes will be appropriately omitted unless a distinction is required.

Figure 1:
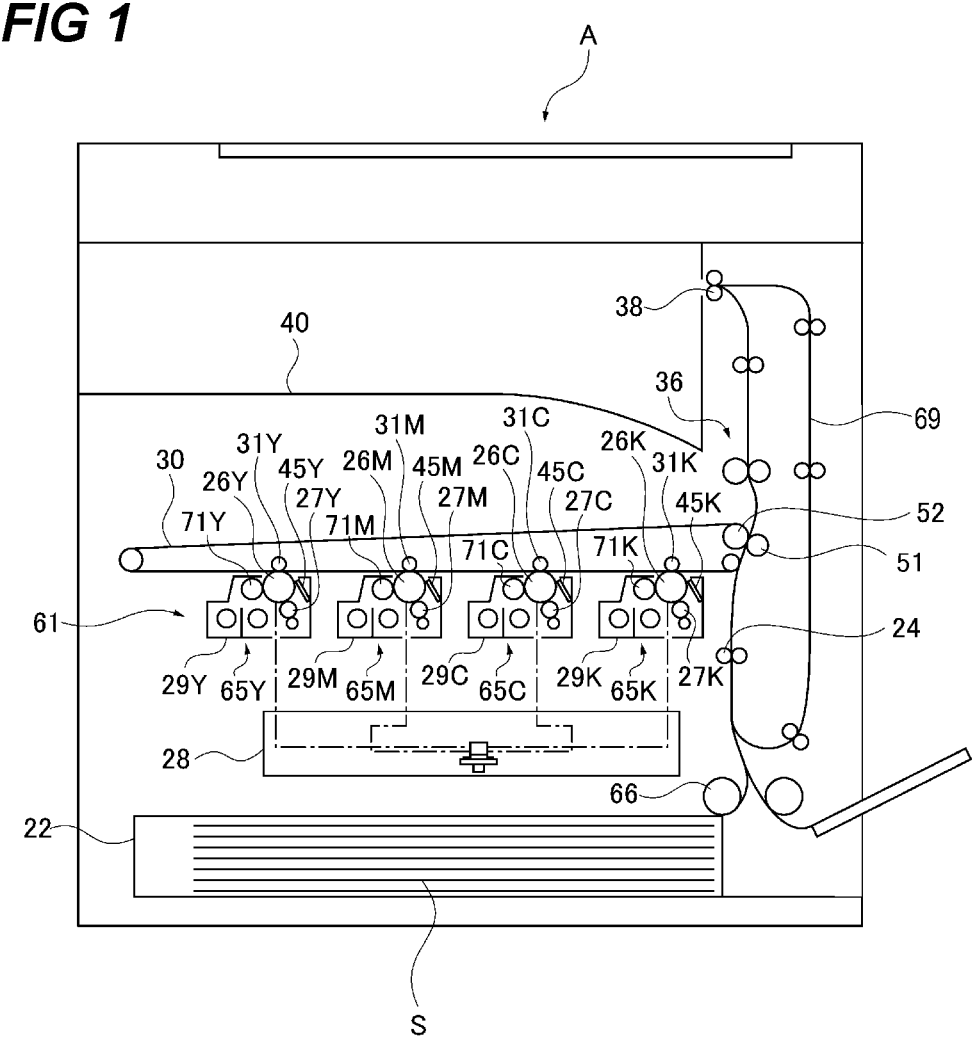
FIG. 1 is a schematic cross-sectional view of an image forming apparatus.

FIG. 1 is a schematic cross-sectional view of the image forming apparatus A. As illustrated in FIG. 1, the image forming apparatus A includes an image forming portion 61 that forms an image on a sheet S. The image forming portion 61 includes process cartridges 65 (65Y, 65M, 65C, and 65K), a laser scanner unit 28, primary transfer rollers 31 (31Y, 31M, 31C, and 31K), an intermediate transfer belt 30, a secondary transfer roller 51, and a secondary transfer counter roller 52.

Each of the process cartridges 65 (image forming units) is configured to be detachably attachable to the image forming apparatus A. The process cartridges 65 include photosensitive drums 26 (26Y, 26M, 26C, and 26K) as photosensitive members and charging rollers 27 (27Y, 27M, 27C, and 27K). In addition, the process cartridges 65 include developing units 29 (29Y, 29M, 29C, or 29K) including developing sleeves 71 (71Y, 71M, 71C, and 71K) as developer carriers and cleaning blades 45 (45Y, 45M, 45C, and 45K).

Next, an image forming operation will be described. First, when a controller (not illustrated) receives an image forming job signal, the sheets S that are stacked and stored in a sheet cassette 22 are to be conveyed to a registration roller 24 by a feeding roller 66. Thereafter, the registration roller 24 conveys the sheet S to a secondary transfer portion at a predetermined timing, the secondary transfer portion being formed by the secondary transfer roller 51 and the secondary transfer counter roller 52.

On the other hand, in the image forming portion 61, first, a surface of the photosensitive drum 26Y is to be charged by the charging roller 27Y. Thereafter, the laser scanner unit 28 irradiates the surface of the photosensitive drum 26Y with laser light according to image data input from an external device (not illustrated). Accordingly, an electrostatic latent image according to the image data is to be formed on the surface of the photosensitive drum 26Y.

Next, the developing sleeve 71Y included in the developing unit 29Y causes the yellow toner to adhere to the electrostatic latent image formed on the surface of the photosensitive drum 26Y, so that a yellow toner image is to be formed on the surface of the photosensitive drum 26Y. The toner image formed on the surface of the photosensitive drum 26Y is to be primarily transferred onto the intermediate transfer belt 30 when a bias is applied to the primary transfer roller 31Y. Thereafter, the toner remaining on the surface of the photosensitive drum 26Y is to be scraped by the cleaning blade 45Y. The cleaning blade 45Y abuts the surface of the photosensitive drum 26Y so as to counter a rotational direction of the photosensitive drum 26Y at the time of image forming.

Magenta, cyan, and black toner images are also to be formed on the photosensitive drums 26M, 26C, and 26K by the same process. Then, when a bias is applied to the primary transfer rollers 31M, 31C, and 31K, these toner images are to be transferred onto the yellow toner image on the intermediate transfer belt 30 in an overlay manner. Accordingly, a full color toner image is to be formed on the surface of the intermediate transfer belt 30. Thereafter, the toners remaining on surfaces of the photosensitive drums 26M, 26C, and 26K are to be scraped by the cleaning blades 45M, 45C, and 45K.

The intermediate transfer belt 30 moves in orbit according to the rotation of the secondary transfer counter roller 52. When the intermediate transfer belt 30 carrying the full color toner image moves, the toner image is to be sent to the secondary transfer portion. Then, in the secondary transfer portion, when a bias is applied to the secondary transfer roller 51, the toner image on the intermediate transfer belt 30 is to be transferred onto the sheet S.

Next, the sheet S onto which the toner image is transferred is to be conveyed to a fixing portion 36, and is to be subjected to a heating and pressing process in the fixing portion 36. Accordingly, the toner image on the sheet S is to be fixed to the sheet S. Thereafter, the sheet S to which the toner image is fixed is to be discharged to a discharge portion 40 by a discharge roller 38.

<Process Cartridge>

Next, a configuration of the process cartridge 65 will be described.

Figure 2:
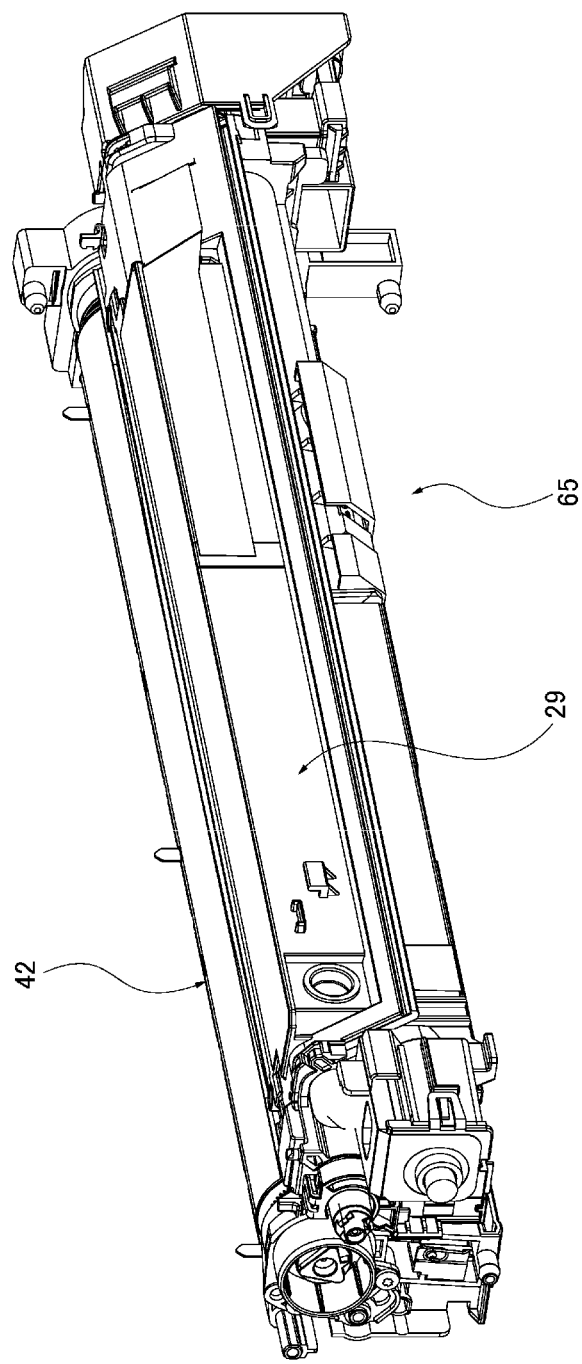
FIG. 2 is a perspective view of a process cartridge.
Figure 3:
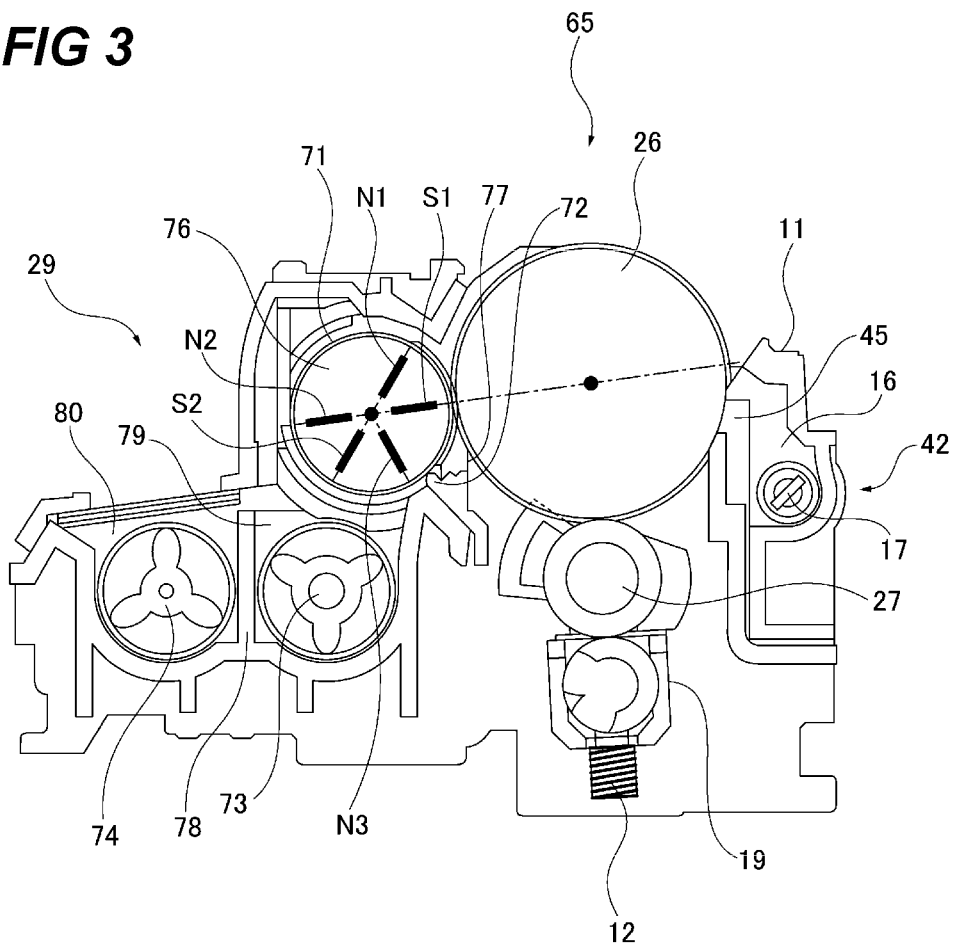
FIG. 3 is a cross-sectional view of the process cartridge.

FIG. 2 is a perspective view of the process cartridge 65. FIG. 3 is a cross-sectional view of the process cartridge 65. As illustrated in FIGS. 2 and 3, the process cartridge 65 includes a drum unit 42 and the developing unit 29.

Figure 4:
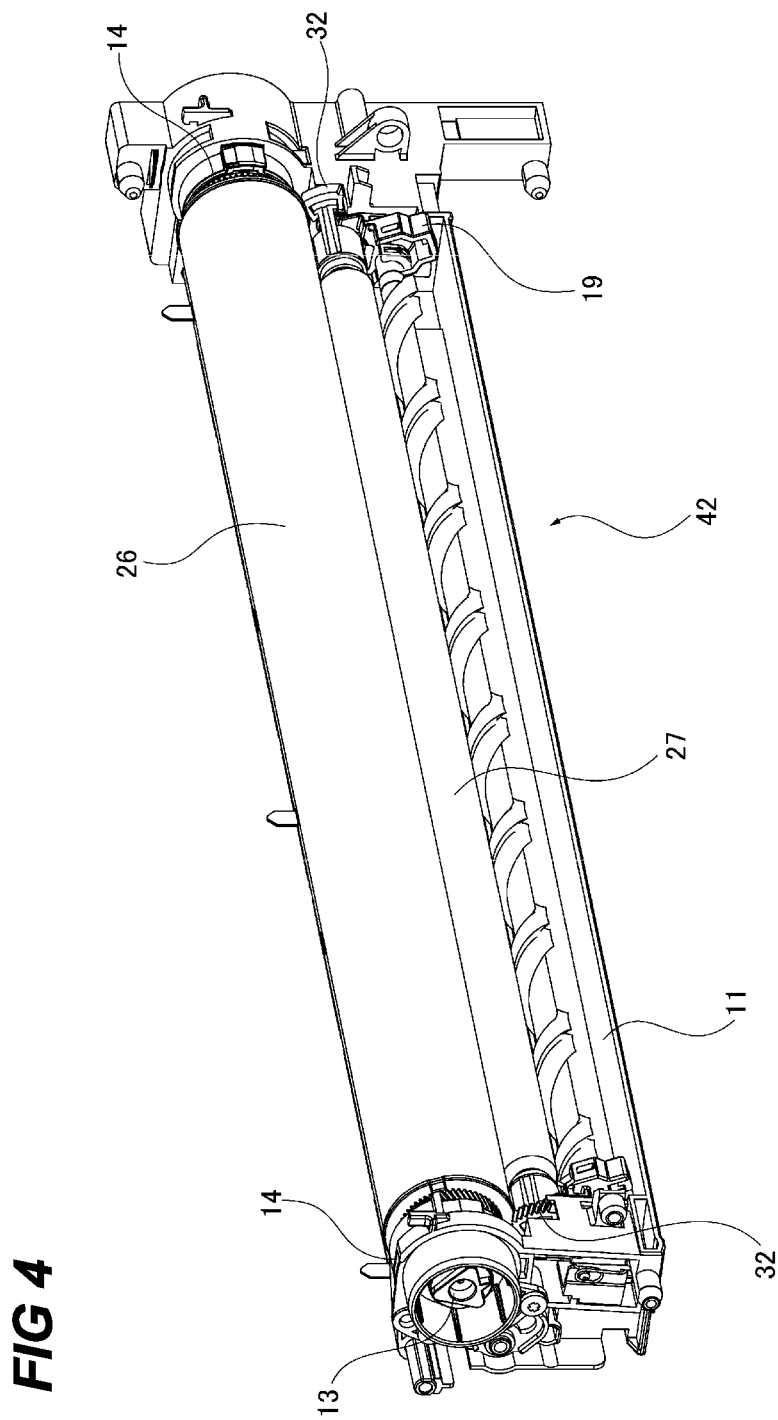
FIG. 4 is a perspective view of a drum unit.

First, a configuration of the drum unit 42 will be described. FIG. 4 is a perspective view of the drum unit 42. FIGS. 5A to 5D are cross-sectional views of a periphery of the photosensitive drum 26 in the drum unit 42, and illustrate a mode where the charging roller 27 is to be separated from the photosensitive drum 26 in order of FIGS. 5A to 5D. As illustrated in FIGS. 4 and 5(A) to 5(D), the drum unit 42 includes the photosensitive drum 26, the charging roller 27, and the cleaning blade 45, and these members are integrally held by a drum container 11.

The drum container 11 rotatably holds the photosensitive drum 26. A drum coupling 13 that receives a driving force from a drive unit 90 to be described later is provided integrally with the photosensitive drum 26 on one end side in a rotational axis direction of the photosensitive drum 26 in the drum container 11. The drum coupling 13 is disposed on a back side of the image forming apparatus A in the drum container 11. In addition, flange gears 14 are provided integrally with the photosensitive drum 26 in both end portions of the photosensitive drum 26 in the rotational axis direction.

In addition, the drum container 11 is provided with a recovery portion 16 (FIG. 3) that recovers a toner removed from the surface of the photosensitive drum 26 by the cleaning blade 45. A conveying screw 17 that conveys the toner present in the recovery portion 16 to the outside of the drum unit 42 is provided inside the recovery portion 16. A driving force is to be transmitted from the flange gear 14 to the conveying screw 17 via an idler gear 67 to cause the conveying screw 17 to rotate and convey the toner. The toner conveyed to the outside of the drum unit 42 by the conveying screw 17 is to be recovered in a container (not illustrated) provided in the image forming apparatus A.

In addition, the drum container 11 is provided with bearings 19 that rotatably hold the charging roller 27. The bearings 19 are held by the drum container 11 so as to be movable in a sliding manner in a direction toward or away from the photosensitive drum 26, and are biased toward the photosensitive drum 26 by springs 12. The charging roller 27 is pressed against the photosensitive drum 26 by a biasing force of the springs 12, and rotates according to the rotation of the photosensitive drum 26.

One-way clutches 21 are provided in both end portions of the charging roller 27. When a torque is applied to the one-way clutches 21 in an opposite direction to a rotational direction of the charging roller 27 at the time of image forming, the one-way clutches 21 are to be locked and rotate integrally with the charging roller 27. In addition, when a predetermined torque or higher (idling torque) is applied to the one-way clutches 21 in the same direction as the rotational direction of the charging roller 27 at the time of image forming, the one-way clutches 21 are to be unlocked and idle without the transmission of a driving force between the one-way clutches 21 and the charging roller 27. In the present embodiment, the one-way clutch 21 is configured to use a latch projection and a rack.

In addition, outer peripheral portions of the one-way clutches 21 are provided with separating members 32 including gear portions 32a that mesh with the flange gears 14 provided in both end portions of the photosensitive drum 26. The separating member 32 and the one-way clutch 21 always rotate integrally regardless of rotational direction. Namely, when the charging roller 27 rotates in the opposite direction to the rotational direction at the time of image forming according to the rotation of the photosensitive drum 26, the one-way clutches 21 and the separating members 32 rotate in conjunction with the rotation. In order to prevent that the charging roller 27 is pressed against the photosensitive drum 26 for a long time and thus the charging roller 27 is deformed to affect adversely the image quality, the separating members 32 separate the charging roller 27 from the photosensitive drum 26 by an operation described below.

Figure 5A:
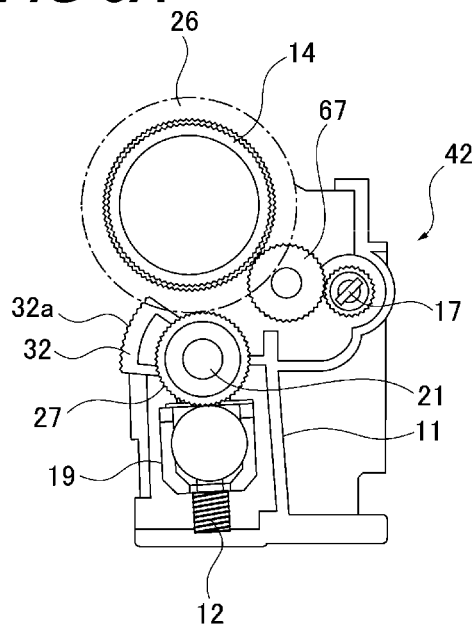
FIGS. 5A to 5D are cross-sectional views of the drum unit.
Figure 5B:
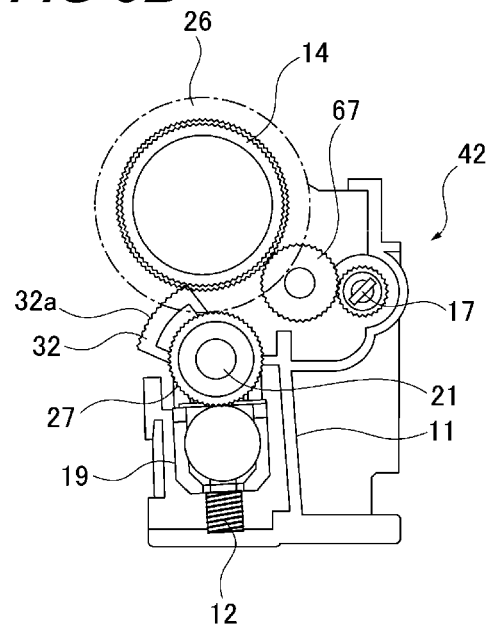

Namely, as illustrated in FIG. 5A, while the image forming apparatus A performs an image forming operation, the gear portion 32a of the separating member 32 and the flange gear 14 are separated from each other and do not mesh with each other. When a predetermined time (eight hours in the present embodiment) elapses after the image forming apparatus A has ended the image forming operation, the photosensitive drum 26 is to be rotated in the direction reverse of the rotational direction at the time of image forming. Accordingly, the charging roller 27 also rotates in the direction reverse of the rotational direction at the time of image forming according to the rotation of the photosensitive drum 26, and the one-way clutch 21 or the separating member 32 also rotates. As illustrated in FIG. 5B, when the separating member 32 rotates, the gear portion 32a of the separating member 32 meshes with the flange gear 14. In the present embodiment, when the charging roller 27 rotates 54 degrees, the one-way clutch 21 is to be locked. Accordingly, the gear portion 32a of the separating member 32 rotating integrally with the one-way clutch 21 meshes with the flange gear 14. The charging roller 27 rotates at a ratio of a diameter to that of the photosensitive drum 26 until the gear portion 32a of the separating member 32 meshes with the flange gear 14. In the present embodiment, since the diameter of the photosensitive drum 26 is φ30 mm and the diameter of the charging roller 27 is φ14 mm, the amount of rotation of the photosensitive drum 26 is 25.2 degrees.

Figure 5C:
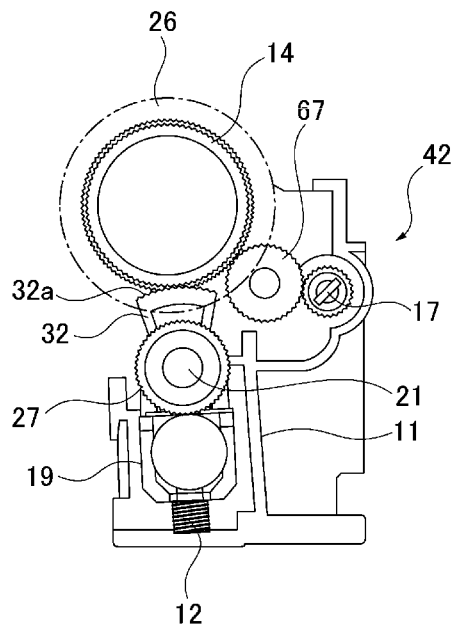

Next, as illustrated in FIG. 5C, the photosensitive drum 26 or the charging roller 27 continues to rotate in the opposite direction to the rotational direction at the time of image forming, the one-way clutch 21 or the separating member 32 also rotates further. When the separating member 32 further rotates, a force is to be applied to the charging roller 27 in the direction away from the photosensitive drum 26 because of the shape of the separating member 32, and the charging roller 27 is to be separated from the photosensitive drum 26 by the biasing force of the spring 12. In the present embodiment, when the charging roller 27 further rotates 45 degrees after the gear portion 32a of the separating member 32 has meshed with the flange gear 14, the charging roller 27 is to be separated from the photosensitive drum 26. After the gear portion 32a of the separating member 32 and the flange gear 14 have meshed with each other, the charging roller 27 rotates at a gear ratio between the gear portion 32a of the separating member 32 and the flange gear 14. In the present embodiment, since the amount of separation between the photosensitive drum 26 and the charging roller 27 is 1 mm, the amount of rotation of the photosensitive drum 26 is 24 degrees. At the time of next image forming, the photosensitive drum 26 rotates in the rotational direction at the time of image forming, so that the charging roller 27 separated from the photosensitive drum 26 performs an operation reverse of the above-described separation operation and comes into contact with the photosensitive drum 26 again.

Figure 5D:
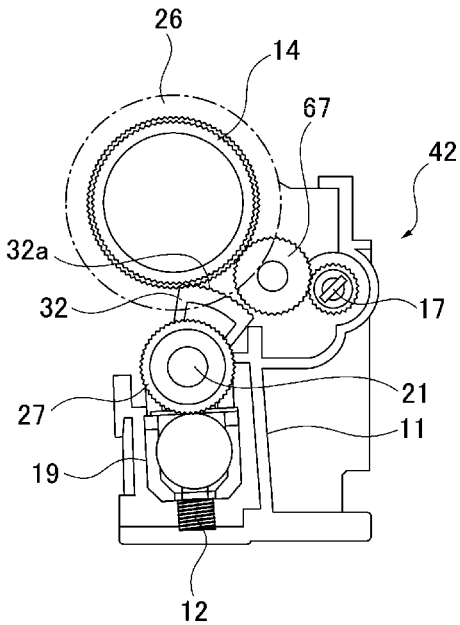

In addition, as illustrated in FIG. 5D, after the charging roller 27 is separated from the photosensitive drum 26, when the photosensitive drum 26 continues to be rotated in the direction reverse of the rotational direction at the time of image forming, the separating member 32 comes into contact with the drum container 11 to cause a malfunction, which is a concern. In the present embodiment, when the charging roller 27 further rotates 45 degrees (24 degrees by the amount of rotation of the photosensitive drum 26) after the charging roller 27 and the photosensitive drum 26 are separated from each other, the separating member 32 and the drum container 11 come into contact with each other. Therefore, in the present embodiment, in order to suppress contact between the separating member 32 and the drum container 11 while separating the charging roller 27 from the photosensitive drum 26, the amount of rotation of the photosensitive drum 26 in the direction reverse of the rotational direction at the time of image forming is set to 49.2 degrees to 73.2 degrees.

Figure 6:
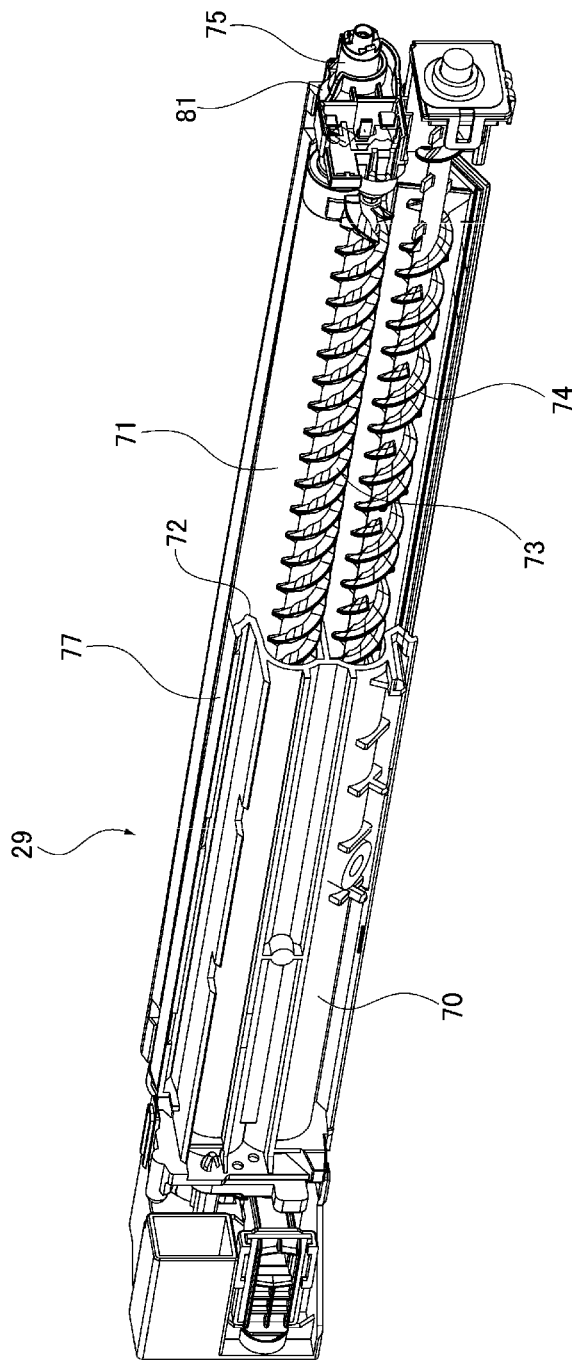
FIG. 6 is a perspective view of a developing unit.

Next, a configuration of the developing unit 29 will be described. FIG. 6 is a perspective view of the developing unit 29. In FIG. 6, in order to describe an internal configuration of the developing unit 29, a developing container 70 is partially cut out and illustrated. As illustrated in FIG. 6, the developing unit 29 includes the developing sleeve 71, a developing blade 72, and conveying screws 73 and 74, and these members are integrally held by the developing container 70.

The developing container 70 has an opening in a portion facing the photosensitive drum 26, and the developing sleeve 71 is disposed to be partially exposed in the opening. The developing sleeve 71 is disposed to face the photosensitive drum 26 at a predetermined interval (240 μm in the present embodiment) therefrom. A developing coupling 75 that receives a driving force from the drive unit 90 to be described later is provided on one end side in a rotational axis direction of the developing sleeve 71. A driving force is to be transmitted from the drive unit 90 to the developing sleeve 71 via the developing coupling 75 to cause the developing sleeve 71 to rotate.

The developing coupling 75 is held by the developing container 70 at a position on the one end side in the rotational axis direction of the developing sleeve 71 in the developing container 70 and on the back side of the image forming apparatus A. A D-cut shaped engaging portion (not illustrated) that engages with the developing coupling 75 is formed in a rotational shaft of the developing sleeve 71, and the engaging portion causes the developing sleeve 71 to rotate integrally with the developing coupling 75. In addition, a sleeve gear 81 is provided on the one end side of the developing sleeve 71 in the developing container 70. The sleeve gear 81 is connected to the rotational shaft of the developing sleeve 71 by a parallel pin (not illustrated), and rotates integrally with the developing sleeve 71.

In addition, the developing sleeve 71 includes a magnet roller 76 (FIG. 3) having a plurality of magnetic poles in a non-rotating state. As illustrated in FIG. 3, the magnet roller 76 has a developing pole S1 in a developing region located to face the photosensitive drum 26. In addition, the magnet roller 76 has a conveying pole N1, a scraping pole N2, a pumping pole S2, and a cut pole N3 in order on a downstream side of the developing pole S1 in a rotational direction of the developing sleeve 71 at the time of image forming. Regarding a center position of each magnetic pole, when the developing pole S1 is at 0 degrees, the conveying pole N1 is at 60 degrees, the scraping pole N2 is at 180 degrees, the pumping pole S2 is at 230 degrees, and the cut pole N3 is at 290 degrees along the rotational direction (counterclockwise direction in FIG. 3) of the developing sleeve 71 at the time of image forming. At the time of image forming, the magnet roller 76 carries a toner by virtue of a magnetic force of each magnetic pole, and conveys the toner to the developing region.

Namely, first, a toner contained in the developing container 70 is to be pumped by the pumping pole S2, and the magnet roller 76 carries the toner onto the developing sleeve 71. Next, the toner carried on the developing sleeve 71 is to be spiked in a brush shape by the cut pole N3. Thereafter, the spiked toner is to be conveyed to the developing region by the rotation of the developing sleeve 71, and is to be moved onto the photosensitive drum 26 by the developing pole S1. Thereafter, the toner remaining on the developing sleeve 71 is gradually raised by a repulsive magnetic field to be formed by the conveying pole N1 and the scraping pole N2 as the toner approaches a center position between the conveying pole N1 and the scraping pole N2, and finally is to be scraped from the developing sleeve 71.

In addition, the developing blade 72 is provided in the vicinity of the developing sleeve 71 at a predetermined interval from the developing sleeve 71. The developing blade 72 abuts the toner carried on the developing sleeve 71 to form a toner layer having a predetermined thickness. Specifically, as the developing sleeve 71 rotates, the toner that is carried on the developing sleeve 71 and is spiked by the cut pole N3 passes between the a tip portion of the developing blade 72 and a surface of the developing sleeve 71, so that the amount of the toner is regulated and a toner layer is formed. In addition, squeeze sheets 77 that suppress the splashing of the toner to the outside of the developing container 70 are affixed to a side of the developing blade 72 on which the developing sleeve 71 is disposed, and to an opposite side.

In addition, the inside of the developing container 70 is partitioned into a developing chamber 79 and a stirring chamber 80 by a partition wall 78 extending in the rotational axis direction of the developing sleeve 71. Both end portions of the partition wall 78 in a longitudinal direction are provided with communication portions (not illustrated) through which the developing chamber 79 and the stirring chamber 80 communicate with each other.

The conveying screws 73 and 74 that rotate and convey the toner by means of spiral blades are provided in the developing chamber 79 and the stirring chamber 80, respectively. The conveying screws 73 and 74 convey the toner in the longitudinal direction of the partition wall 78 and in opposite directions to each other. A driving force is to be transmitted to the conveying screws 73 and 74 from the sleeve gear 81 provided integrally with the developing sleeve 71 to cause the conveying screws 73 and 74 to rotate. When the conveying screws 73 and 74 rotate, the toner circulates between the developing chamber 79 and the stirring chamber 80 via the communication portions (not illustrated).

In addition, whenever an image forming operation is performed, the toner is to be deposited in a space surrounded by the developing sleeve 71, the developing blade 72, and the squeeze sheets 77 in the developing container 70. When the amount of deposition of the toner is excessive, the deposited toner infiltrates into the developing region to cause an image defect called a stain image, which is a concern. In order to suppress the occurrence of an image defect, at the time of non-image forming after the image forming operation has been performed a predetermined number of times, the developing sleeve 71 rotates in an opposite direction to the rotational direction at the time of image forming to move the toner deposited in the space to a stirring chamber 80 side, the space being surrounded by the developing sleeve 71, the squeeze sheets 77, and the developing blade 72. Specifically, with the rotation of the developing sleeve 71, the toner raised by a repulsive magnetic field to be formed by the conveying pole N1 and the scraping pole N2 passes through the space surrounded by the developing sleeve 71, the squeeze sheets 77, and the developing blade 72, to push the toner deposited in the space to the stirring chamber 80 side. In the present embodiment, a rotational operation of the developing sleeve 71 in the opposite direction is to be performed whenever the image forming operation is performed on 500 A4 sheets.

Here, when the amount of rotation of the developing sleeve 71 in the opposite direction to the rotational direction at the time of image forming is large, the toner pumped by the pumping pole S2 does not pass by the developing blade 72, and a large amount of the toner is to be conveyed to the developing region. Accordingly, the toner splashes to the outside of the developing container 70, which is a concern. Therefore, in order to suppress the splashing of the toner to the outside, the amount of rotation of the developing sleeve 71 in the direction reverse of the rotational direction at the time of image forming is set to an angle from the conveying pole N1 to the scraping pole N2. Namely, in the present embodiment, the amount of rotation is set to an angle of 60 degrees to 180 degrees at an angle around a rotational axis of the developing sleeve 71.

<Drive Unit>

Next, a configuration of the drive unit 90 that drives the process cartridge 65 will be described.

Figure 7:
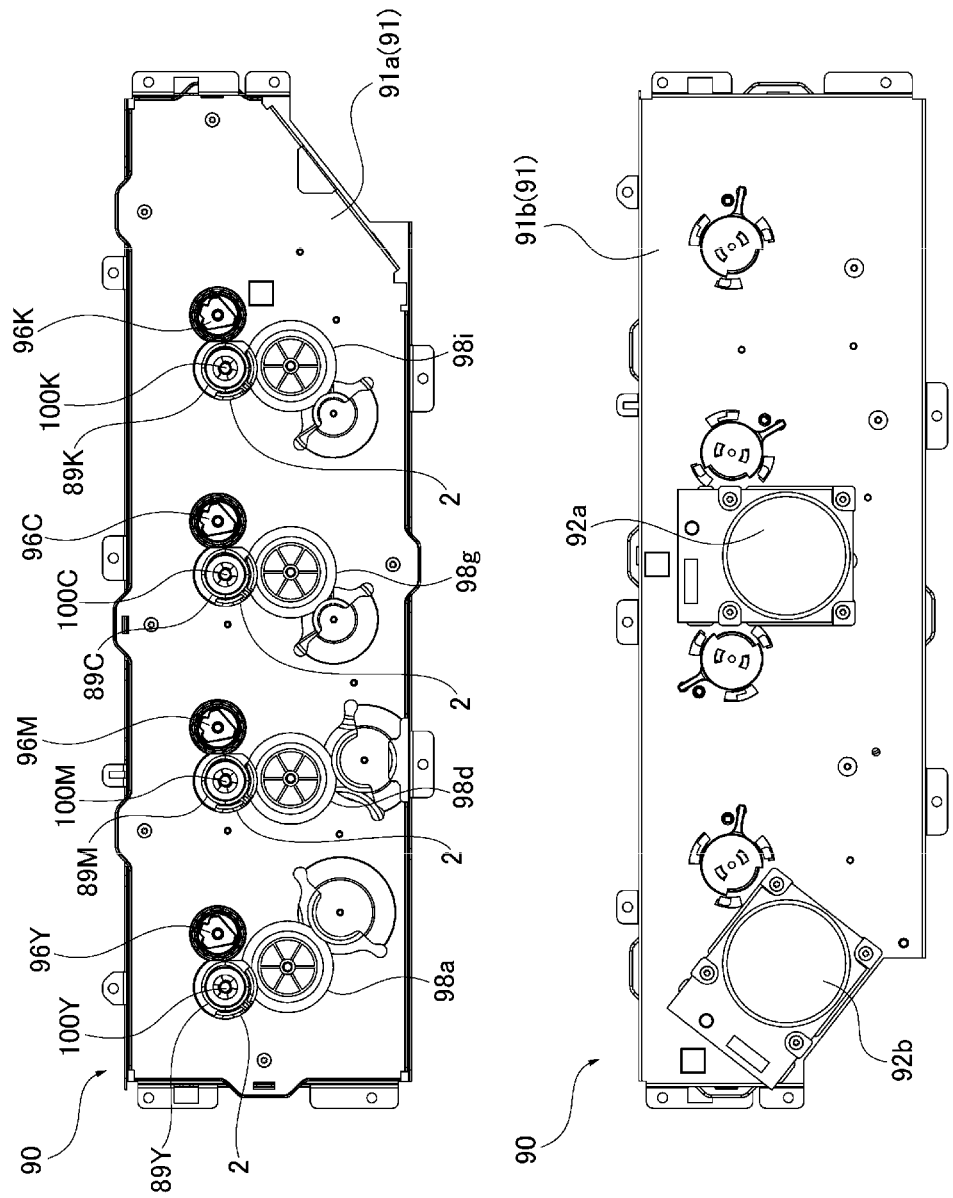
FIGS. 7A and 7B are a front view and a rear view of a drive unit.
Figure 8:
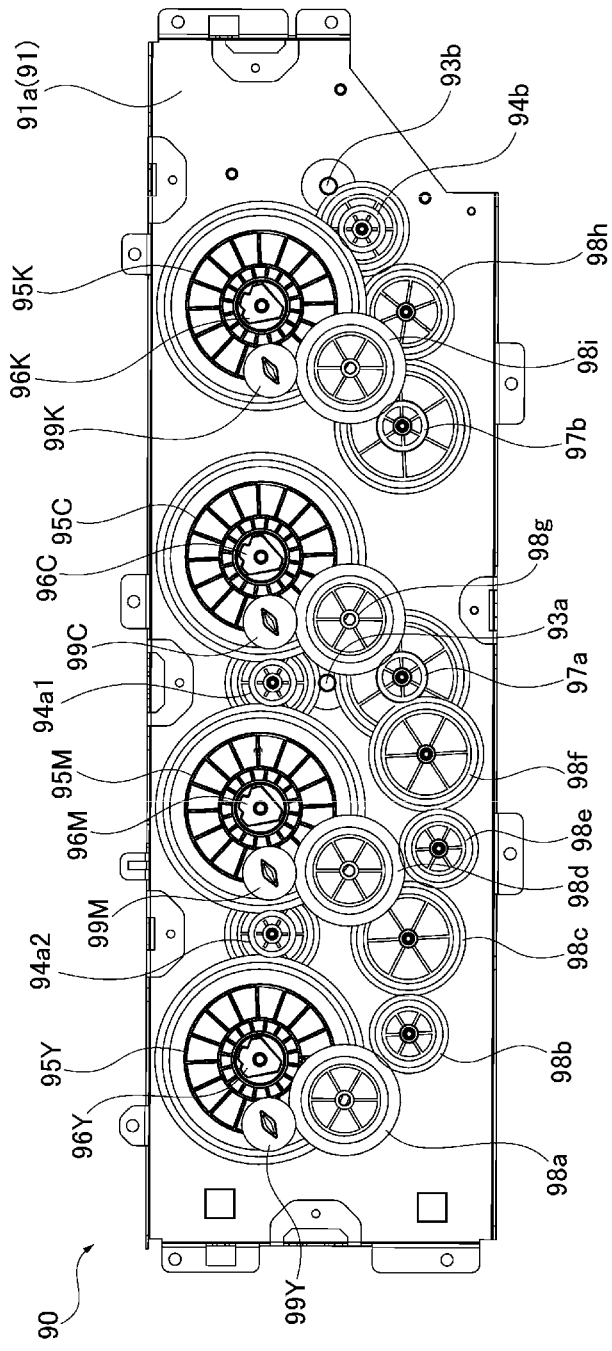
FIG. 8 is a view illustrating gears of the drive unit.

FIG. 7A is a front view of the drive unit 90. FIG. 7B is a rear view of the drive unit 90. FIG. 8 is a view illustrating gears included in the drive unit 90. As illustrated in FIGS. 7A, 7B, and 8, the drive unit 90 includes a drive frame 91 that has a box shape and is formed of a rear frame 91a and a front frame 91b.

A motor 92a that is a drive source of the photosensitive drums 26Y, 26M, and 26C and the developing sleeves 71Y, 71M, and 71C, and a motor 92b that is a drive source of the photosensitive drum 26K and the developing sleeve 71K are fixed to the drive frame 91. In the present embodiment, the motors 92a and 92b are brushless DC motors.

A pinion gear 93a is attached to a shaft of the motor 92a. A drum reduction gear 94a1 meshes with the pinion gear 93a, and drum drive gears 95M and 95C mesh with the drum reduction gear 94a1. In addition, a drum reduction gear 94a2 meshes with the drum drive gear 95M and a drum drive gear 95Y. The rotational speed of the drum drive gears 95Y, 95M, and 95C is reduced at a gear ratio of the gear train with respect to the rotational speed of the motor 92a.

A pinion gear 93b is attached to a shaft of the motor 92b. A drum reduction gear 94b meshes with the pinion gear 93b, and a drum drive gear 95K meshes with the drum reduction gear 94b. The rotational speed of the drum drive gear 95K is reduced at a gear ratio of the gear train with respect to the rotational speed of the motor 92b.

Figure 9A:
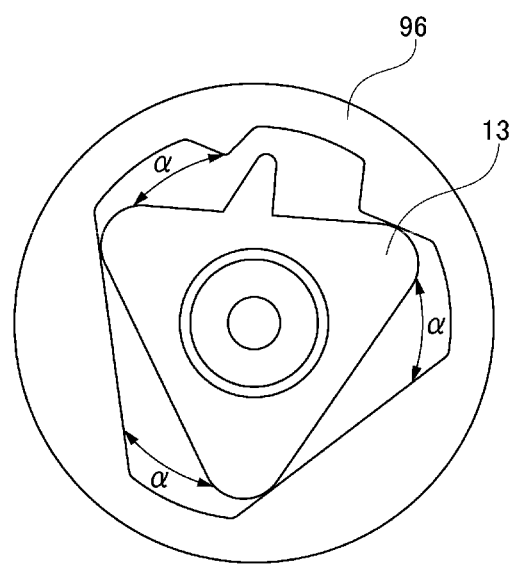
FIGS. 9A and 9B are views illustrating configurations of a drive coupling, a drum coupling, and a developing coupling.

In addition, drive couplings 96Y, 96M, 96C, and 96K that engage with the drum coupling 13 provided in the process cartridges 65Y, 65M, 65C, and 65K are provided coaxially with the drum drive gears 95Y, 95M, 95C, and 95K, respectively. Here, as illustrated in FIG. 9A, a play α in the rotational direction is provided between the drive coupling 96 of each color and the drum coupling 13. In the present embodiment, the play α is set to 34 degrees at an angle around a rotational axis of the photosensitive drum 26.

With such a configuration, a driving force of the motor 92a is to be transmitted to the drum coupling 13 via the pinion gear 93a, the drum reduction gears 94a1 and 94a2, the drum drive gears 95Y, 95M, and 95C, and the drive couplings 96Y, 96M, and 96C. Accordingly, the photosensitive drum 26Y, 26M, and 26C rotate. In addition, a driving force of the motor 92b is to be transmitted to the drum coupling 13 via the pinion gear 93b, the drum reduction gear 94b, the drum drive gear 95K, and the drive coupling 96K. Accordingly, the photosensitive drum 26K rotates.

In addition, a developing reduction gear 97a meshes with the pinion gear 93a. In addition, a plurality of idler gears 98a to 98g is provided to form a gear train between the idler gears 98a to 98g and the developing reduction gear 97a. The idler gears 98a, 98d, and 98g mesh with developing drive gears 99Y, 99M, and 99C, respectively. The rotational speeds of the developing sleeves 71Y, 71M, and 71C are reduced at a gear ratio of the gear train with respect to the number of revolutions of the motor 92a so as to be 198% of the rotational speeds of the photosensitive drums 26Y, 26M, and 26C.

In addition, the pinion gear 93b meshes with a developing drive gear 99K via a gear train formed of the drum reduction gear 94b, an idler gear 98h, a developing reduction gear 97b, and an idler gear 98i. The rotational speed of the developing sleeve 71K is reduced at a gear ratio of the gear train with respect to the number of revolutions of the motor 92b so as to be 198% of the rotational speed of the photosensitive drum 26K.

Figure 9B:
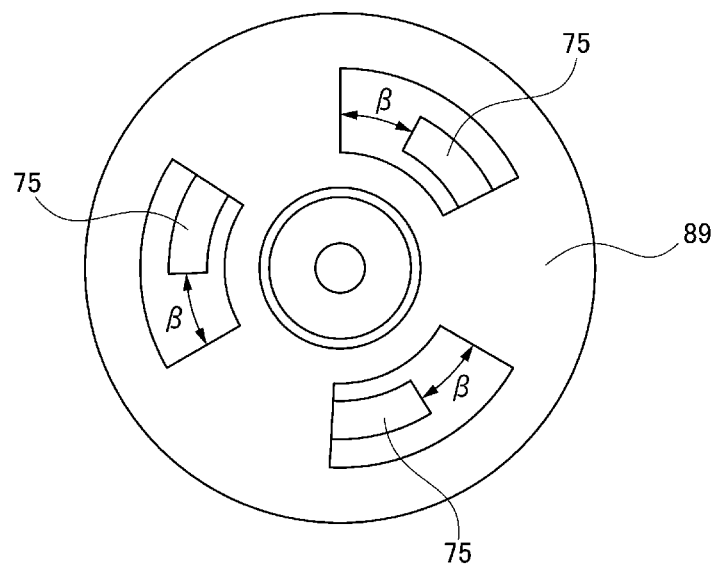

In addition, rotational shafts (not illustrated) of the developing drive gears 99Y, 99M, 99C, and 99K are connected to rotational shafts 100Y, 100M, 100C, and 100K of the developing coupling 75 provided in the process cartridges 65Y, 65M, 65C, and 65K illustrated in FIG. 7A by an Oldham coupling 1 to be described later. In addition, the developing coupling 75 engages with drive couplings 89Y, 89M, 89C, and 89K forming a part of the Oldham coupling 1. Here, as illustrated in FIG. 9B, the developing coupling 75 includes three protruded portions, and the drive coupling 89 is provided with three fitting grooves to which the three protruded portions of the developing coupling 75 are fitted. In such a manner, since three or more protruded portions of one coupling and three or more fitting grooves of the other coupling are provided, drive can be stably transmitted. A play β in the rotational direction is provided between the fitting groove of the drive coupling 89 of each color and the protruded portion of the developing coupling 75. In the present embodiment, the play is set to 30 degrees at an angle around the rotational axis of the developing sleeve 71.

With such a configuration, a driving force of the motor 92a is to be transmitted to the developing coupling 75 via the pinion gear 93a, the developing reduction gear 97a, the idler gears 98a to 98g, the developing drive gears 99Y, 99M, and 99C, and the drive couplings 89Y, 89M, and 89C. Accordingly, the developing sleeves 71Y, 71M, and 71C rotate. In addition, a driving force of the motor 92b is to be transmitted to the developing coupling 75 via the pinion gear 93b, the developing reduction gear 97a, the idler gears 98h and 98i, the developing drive gear 99K, and the drive coupling 89K. Accordingly, the developing sleeve 71K rotates.

As described above, in the present embodiment, the rotational speed of the developing sleeve 71 of each color is 198% of the rotational speed of the photosensitive drum 26 of the each color. In addition, in the present embodiment, the diameter of the photosensitive drum 26 is φ30 mm, and the diameter of the developing sleeve 71 is (I) 18 mm. Therefore, a difference in gear ratio between the photosensitive drum 26 and the developing sleeve 71 is 3.3 times. Namely, when the photosensitive drum 26 makes one revolution, the developing sleeve 71 makes 3.3 revolutions.

<Oldham Coupling>

Next, a configuration of the Oldham coupling 1 will be described.

Figure 10:
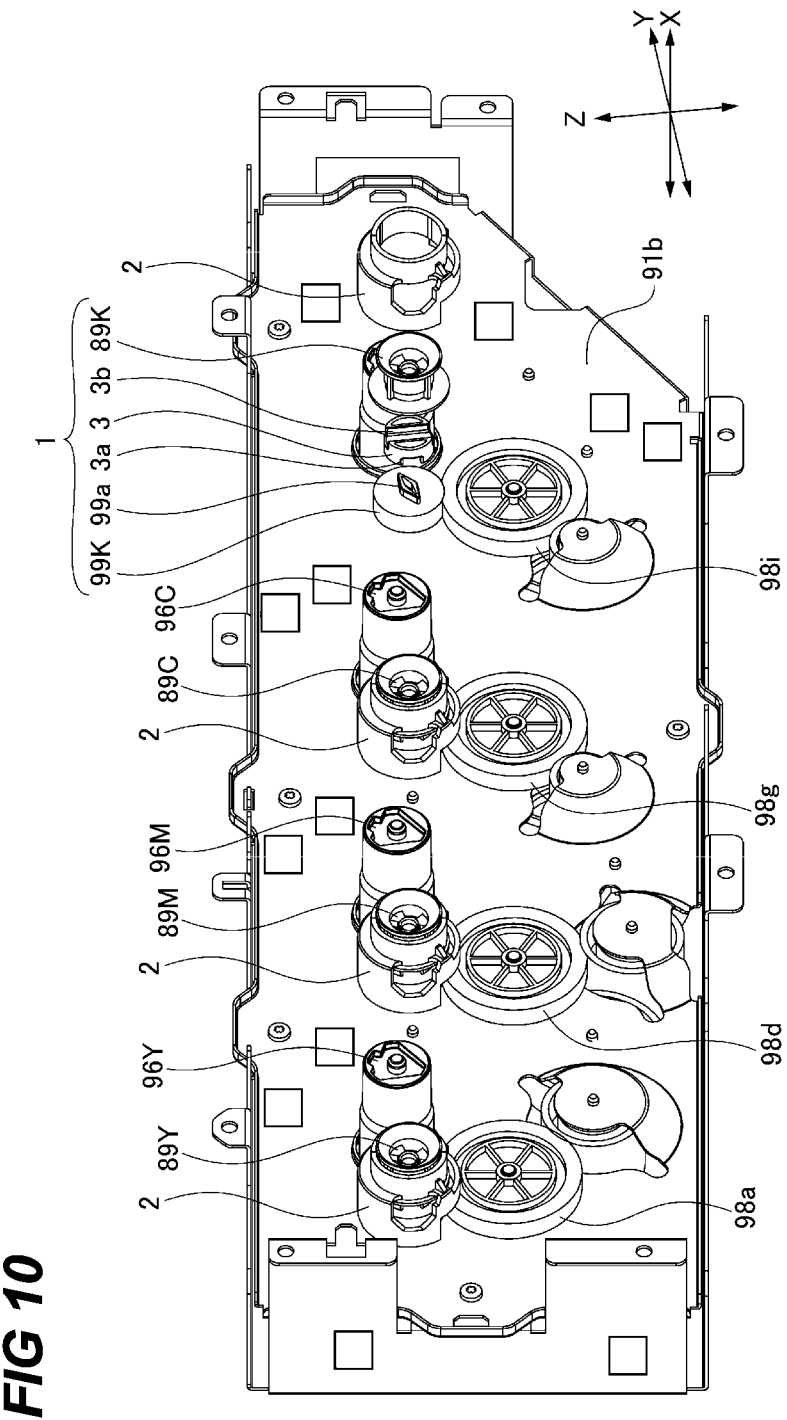
FIG. 10 is an exploded perspective view of an Oldham coupling.
Figure 11:
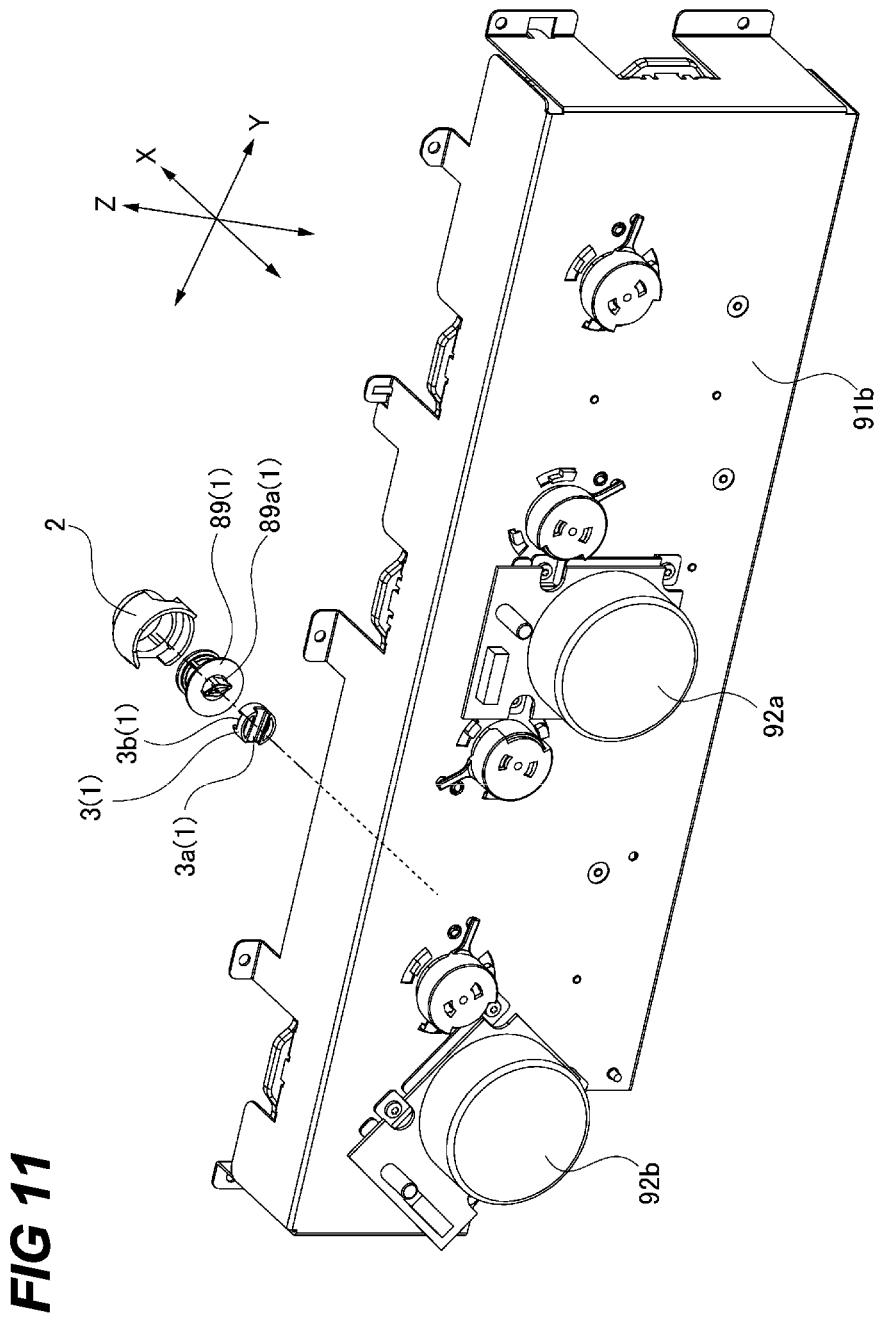
FIG. 11 is an exploded perspective view of the Oldham coupling.
Figure 12A:
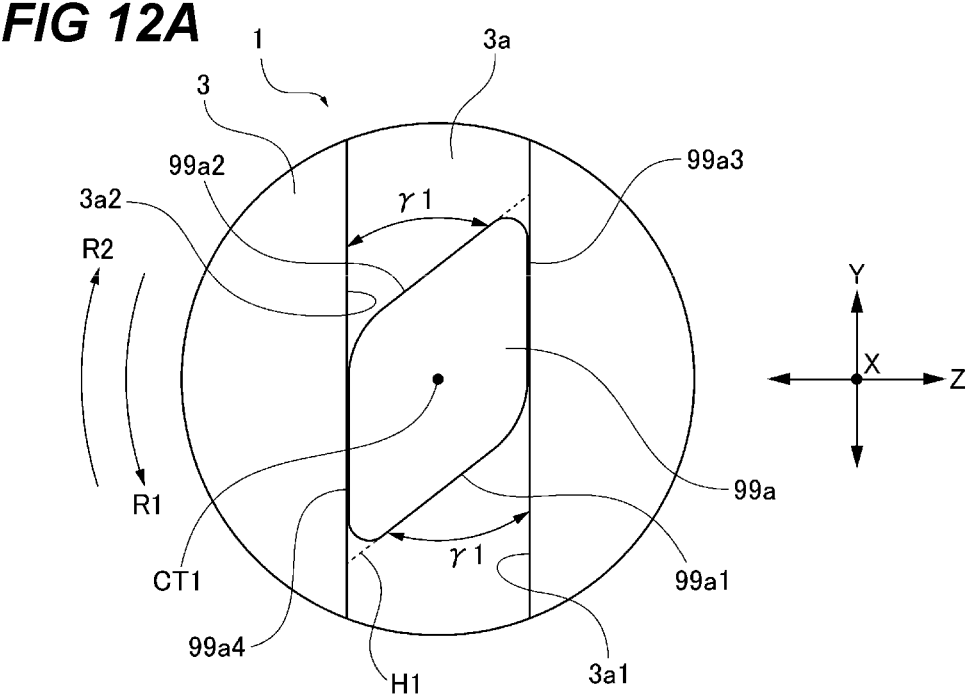
FIGS. 12A and 12B are views illustrating fitting portions between a developing drive gear, an intermediate member, and the drive coupling of the Oldham coupling.
Figure 12B:
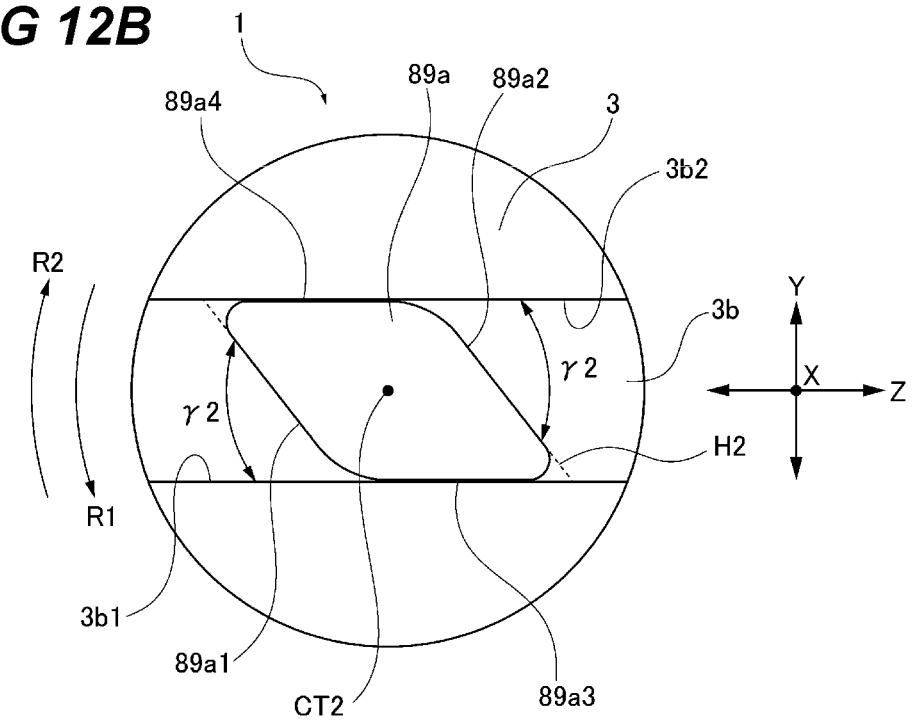

FIG. 10 is an exploded perspective view of the Oldham coupling 1 as seen from a front side of the image forming apparatus A. FIG. 11 is an exploded perspective view of the Oldham coupling 1 as seen from a back side of the image forming apparatus A. FIG. 12A is a view illustrating a fitting portion between the developing drive gear 99 and an intermediate member 3 of the Oldham coupling 1. FIG. 12B is a view illustrating a fitting portion between the drive coupling 89 and the intermediate member 3 of the Oldham coupling 1.

As illustrated in FIGS. 10 and 11, the Oldham coupling 1 includes the developing drive gear 99 (first hub), the drive coupling 89 (second hub), and the intermediate member 3 that transmits a driving force between the developing drive gear 99 and the drive coupling 89. The Oldham coupling 1 is rotatably held inside a coupling holder 2 provided in the front frame 91b.

A recessed portion 3a (first recessed portion) having a rectangular cross section that is recessed in an arrow X direction and that extends in an arrow Y direction (first direction) orthogonal to the arrow X direction is formed in an end surface on one side of the intermediate member 3 in the arrow X direction that is a rotational axis direction of the Oldham coupling 1. In addition, a recessed portion 3b (second recessed portion) having a rectangular cross section that is recessed in the arrow X direction and that extends in an arrow Z direction (second direction) orthogonal to the arrow X direction and to the arrow Y direction is formed in an end surface on the other side of the intermediate member 3 in the arrow X direction. The recessed portions 3a and 3b have the same shape except that the recessed portions 3a and 3b extend in direction orthogonal to each other. The rotational axis direction of the Oldham coupling 1 is the same direction as each of a rotational axis direction of the developing drive gear 99, a rotational axis direction of the drive coupling 89, and a rotational axis direction of the intermediate member 3.

In addition, a protruded portion 99a (first protruded portion) that protrudes in the arrow X direction and is fitted to the recessed portion 3a of the intermediate member 3 is formed in one end portion of the developing drive gear 99 in the rotational axis direction (arrow X direction) of the Oldham coupling 1. In addition, a protruded portion 89a (second protruded portion) that protrudes in the arrow X direction and is fitted to the recessed portion 3b of the intermediate member 3 is formed in one end portion of the drive coupling 89 in the rotational axis direction of the Oldham coupling 1.

When the developing drive gear 99 is rotated by a driving force of the motor 92a or the motor 92b, the protruded portion 99a of the developing drive gear 99 comes into contact with inner walls of the recessed portion 3a while moving in a sliding manner relative to the inside of the recessed portion 3a, and transmits the driving force to the intermediate member 3, so that the intermediate member 3 rotates. Then, when the intermediate member 3 rotates, inner walls of the recessed portion 3b come into contact with the protruded portion 89a of the drive coupling 89 while the protruded portion 89a moves in a sliding manner relative to the inside of the recessed portion 3b, and transmit the driving force to the drive coupling 89, so that the drive coupling 89 rotates. In such a manner, even when the rotational axis of the rotational shaft (not illustrated) of the developing drive gear 99 and the rotational axis of the rotational shaft 100 of the developing coupling 75 are misaligned from each other, a driving force of the motor 92a or the motor 92b is to be stably transmitted to the rotational shaft 100 of the developing coupling 75 via the Oldham coupling 1.

Here, as illustrated in FIG. 12A, the protruded portion 99a includes an edge portion 99a1 (first edge portion) that comes into contact with one inner wall 3a1 (first inner wall) of the recessed portion 3a in a width direction when the Oldham coupling 1 rotates in an arrow R1 direction (first rotational direction). In addition, the protruded portion 99a includes an edge portion 99a2 (second edge portion) that comes into contact with the other inner wall 3a2 (second inner wall) of the recessed portion 3a in the width direction when the Oldham coupling 1 rotates in the arrow R1 direction. In addition, the protruded portion 99a includes an edge portion 99a3 (third edge portion) that comes into contact with the inner wall 3a1 of the recessed portion 3a and an edge portion 99a4 (fourth edge portion) that comes into contact with the inner wall 3a2 when the Oldham coupling 1 rotates in an arrow R2 direction (second rotational direction). The edge portions 99a1 to 99a4 come into surface contact with the inner wall 3a1 or the inner wall 3a2 of the recessed portion 3a by way of surfaces extending in the arrow Y direction and in the arrow X direction. The width direction of the recessed portion 3a is orthogonal to the arrow Y direction in which the recessed portion 3a extends, and is the arrow Z direction that is the same direction as a direction in which the recessed portion 3b extends.

Here, when the Oldham coupling 1 rotates in the arrow R2 direction, a portion of the edge portion 99a1 that is farthest from a rotation center CT1 (first rotation center) of the developing drive gear 99 in the arrow Y direction is to be located closer to the inner wall 3a2 than the rotation center CT1 in the arrow Z direction. In addition, when the Oldham coupling 1 rotates in the arrow R2 direction, a portion of the edge portion 99a2 that is farthest from the rotation center CT1 in the arrow Y direction is to be located closer to the inner wall 3a1 than the rotation center CT1 in the arrow Z direction. In addition, when the Oldham coupling 1 rotates in the arrow R1 direction, a portion of the edge portion 99a3 that is farthest from the rotation center CT1 in the arrow Y direction is to be located closer to the inner wall 3a2 than the rotation center CT1 in the arrow Z direction. In addition, when the Oldham coupling 1 rotates in the arrow R1 direction, a portion of the edge portion 99a4 that is farthest from the rotation center CT1 in the arrow Y direction is to be located closer to the inner wall 3a1 than the rotation center CT1 in the arrow Z direction.

In addition, when seen in the rotational axis direction of the Oldham coupling 1, the protruded portion 99a has a substantially rhombic shape formed by a virtual line H1 connecting the edge portion 99a1, the edge portion 99a2, the edge portion 99a3, and the edge portion 99a4. Specifically, a rhombic shape is formed in which when a corner is formed by virtual lines obtained by extending the edge portion 99a1 and the edge portion 99a4, the angle of the corner is 45 degrees and when a corner is formed by virtual lines obtained by extending the edge portion 99a2 and the edge portion 99a3, the angle of the corner is 45 degrees. The substantially rhombic shape may be configured to have the above-described corners or may be a shape in which the above-described corners are chamfered.

With such a configuration, when the Oldham coupling 1 rotates in the arrow R2 direction, a play γ1 is to be formed between the edge portion 99a1 and the inner wall 3a1 of the recessed portion 3a and between the edge portion 99a2 and the inner wall 3a2 of the recessed portion 3a. In addition, when the Oldham coupling 1 rotates in the arrow R1 direction, the same play γ1 is to be formed between the edge portion 99a3 and the inner wall 3a1 of the recessed portion 3a and between the edge portion 99a4 and the inner wall 3a2 of the recessed portion 3a.

In addition, as illustrated in FIG. 12B, the protruded portion 89a has the same shape as that of the protruded portion 99a. Namely, the protruded portion 89a includes an edge portion 89a1 (fifth edge portion) that comes into contact with one inner wall 3b1 (third inner wall) of the recessed portion 3b in a width direction when the Oldham coupling 1 rotates in the arrow R1 direction. In addition, the protruded portion 89a includes an edge portion 89a2 (sixth edge portion) that comes into contact with the other inner wall 3b2 (fourth inner wall) of the recessed portion 3b in the width direction when the Oldham coupling 1 rotates in the arrow R1 direction. In addition, the protruded portion 89a includes an edge portion 89a3 (seventh edge portion) that comes into contact with the inner wall 3b1 of the recessed portion 3b and an edge portion 89a4 (eighth edge portion) that comes into contact with the inner wall 3b2 when the Oldham coupling 1 rotates in the arrow R2 direction. The edge portions 89a1 to 89a4 come into surface contact with the inner wall 3b1 or the inner wall 3b2 of the recessed portion 3b by way of surfaces extending in the arrow Z direction and in the arrow X direction. The width direction of the recessed portion 3b is orthogonal to the arrow Z direction in which the recessed portion 3b extends, and is the arrow Y direction that is the same direction as a direction in which the recessed portion 3a extends.

Here, when the Oldham coupling 1 rotates in the arrow R2 direction, a portion of the edge portion 89a1 that is farthest from a rotation center CT2 (second rotation center) of the drive coupling 89 in the arrow Z direction is to be located closer to the inner wall 3b2 than the rotation center CT2 in the arrow Y direction. In addition, when the Oldham coupling 1 rotates in the arrow R2 direction, a portion of the edge portion 89a2 that is farthest from the rotation center CT2 in the arrow Z direction is to be located closer to the inner wall 3b1 than the rotation center CT2 in the arrow Y direction. In addition, when the Oldham coupling 1 rotates in the arrow R1 direction, a portion of the edge portion 89a3 that is farthest from the rotation center CT2 in the arrow Z direction is to be located closer to the inner wall 3b2 than the rotation center CT2 in the arrow Y direction. In addition, when the Oldham coupling 1 rotates in the arrow R1 direction, a portion of the edge portion 89a4 that is farthest from the rotation center CT2 in the arrow Z direction is to be located closer to the inner wall 3b1 than the rotation center CT2 in the arrow Y direction.

In addition, when seen in the rotational axis direction of the Oldham coupling 1, the protruded portion 89a has a substantially rhombic shape formed by a virtual line H2 connecting the edge portion 89a1, the edge portion 89a2, the edge portion 89a3, and the edge portion 89a4. Specifically, a rhombic shape is formed in which when a corner is formed by virtual lines obtained by extending the edge portion 89a1 and the edge portion 89a4, the angle of the corner is 45 degrees and when a corner is formed by virtual lines obtained by extending the edge portion 89a2 and the edge portion 89a3, the angle of the corner is 45 degrees. The substantially rhombic shape may be configured to have the above-described corners or may be a shape in which the above-described corners are chamfered as in the present embodiment.

With such a configuration, when the Oldham coupling 1 rotates in the arrow R2 direction, a play γ2 is to be formed between the edge portion 89a1 and the inner wall 3b1 of the recessed portion 3b and between the edge portion 89a2 and the inner wall 3b2 of the recessed portion 3b. In addition, when the Oldham coupling 1 rotates in the arrow R1 direction, the same play γ2 is to be formed between the edge portion 89a3 and the inner wall 3b1 of the recessed portion 3b and between the edge portion 89a4 and the inner wall 3b2 of the recessed portion 3b.

In such a manner, according to the present embodiment, in the Oldham coupling 1, a driving force can be transmitted while the play γ1 in the rotational direction is provided between the developing drive gear 99 and the intermediate member 3 and the play γ2 in the rotational direction is provided between the drive coupling 89 and the intermediate member 3. In addition, since the edge portion 99a1 to 99a4 come into surface contact with the inner wall 3a1 or the inner wall 3a2 of the recessed portion 3a and the edge portion 89a1 to 89a4 come into surface contact with the inner wall 3b1 or the inner wall 3b2 of the recessed portion 3b, the strength of the protruded portions 99a and 89a can be secured and a deformation thereof can be suppressed when a driving force is transmitted.

In addition, as in the present embodiment, when a play in the rotational direction is provided between the developing drive gear 99 and the intermediate member 3 and between the drive coupling 89 and the intermediate member 3, a decrease in the strength of the coupling itself can be more suppressed than when the play provided between the protruded portion of the developing coupling 75 and the fitting groove of the drive coupling 89 is increased. In addition, an incident that drive cannot be stably transmitted because of an increase in the play β can be suppressed.

For example, when the length of the fitting groove of the drive coupling 89 in the rotational direction is increased so as to increase the play β, the strength of the drive coupling 89 itself decreases and drive cannot be stably transmitted, which is a concern. In addition, when the length of the fitting groove of the drive coupling 89 in the rotational direction is increased, three fitting grooves cannot be provided depending on the size of the drive coupling 89, which is a concern. When only two fitting grooves are provided, two protruded portions of the developing coupling 75 are also provided, and the two protruded portions and the two fitting grooves are fitted to each other to transmit a driving force. In this case, drive cannot be stably transmitted when a fitting force between one of pairs of the protruded portions and the fitting grooves is weak. In addition, when the length of the protruded portion of the developing coupling 75 in the rotational direction is reduced so as to increase the play β, the protruded portion of the developing coupling 75 decreases in strength because of a reduction in the length in the rotational direction, and is damaged at the time of drive transmission, which is a concern.

In the present embodiment, the configuration is employed in which not only the play β between the developing coupling 75 and the drive coupling 89 to be separated when the unit is attached and detached is provided, but also a play between the developing drive gear 99 and the intermediate member 3 of the Oldham coupling and/or a play between the drive coupling 89 and the intermediate member 3 are provided. Accordingly, drive can be stably transmitted, and a driving force can be selectively transmitted to a drive target depending on whether the motor rotates positively or the motor rotates reversely. In addition, in the configuration in which a play in the rotational direction is provided, a driving force can be transmitted even in a state where rotational axes of two rotational shafts are misaligned from each other.

<Operation Timing when Motor Rotates Reversely>

Next, operation timings when the photosensitive drum 26, the developing sleeve 71, and the charging roller 27 rotate in the opposite direction to the rotational direction at the time of image forming will be described.

Figure 13:
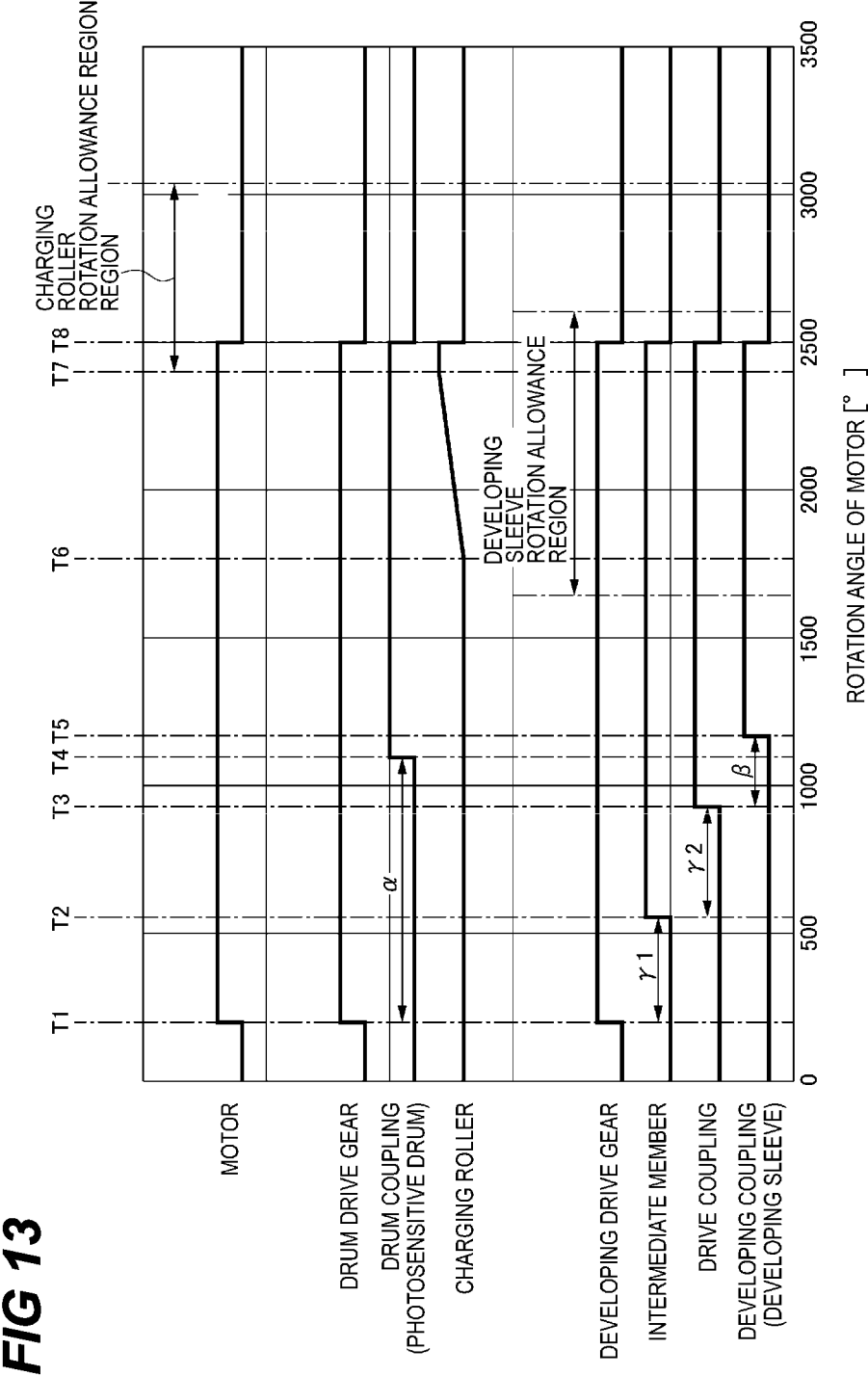
FIG. 13 is a timing chart illustrating an operation timing of each member after the ending of an image forming operation.

FIG. 13 is a timing chart illustrating operation timings when the photosensitive drum 26, the developing sleeve 71, and the charging roller 27 rotate in the opposite direction to the rotational direction at the time of image forming from a state where the drive by the motors 92a and 92b is stopped. Here, when an image forming operation ends, it is assumed that in a state where the play α between the drive coupling 96 and the drum coupling 13, the play β between the drive coupling 89 and the developing coupling 75, and the plays γ1 and γ2 of the Oldham coupling 1 are secured, these members are stopped.

The motors 92a and 92b start rotation driving in the opposite direction to the rotational direction at the time of image forming from this state. When the motors 92a and 92b start rotating, the drum drive gear 95 and the developing drive gear 99 start rotating (timing T1).

Next, when a timing T2 is reached, the play γ1 of the Oldham coupling 1 is zeroed out by the rotation of the developing drive gear 99, and the intermediate member 3 starts to rotate. Thereafter, when a timing T3 is reached, the play γ2 of the Oldham coupling 1 is zeroed out by the rotation of the intermediate member 3, and the drive coupling 89 starts to rotate.

Next, when a timing T4 is reached, the play α is zeroed out by the rotation of the drum drive gear 95, the drum coupling 13 starts to rotate, and accordingly, the photosensitive drum 26 starts to rotate.

Thereafter, when a timing T5 is reached, the play β is zeroed out by the rotation of the drive coupling 89, the developing coupling 75 starts to rotate, and accordingly, the developing sleeve 71 starts to rotate.

Next, when a timing T6 is reached, the gear portions 32a of the separating members 32 mesh with the flange gears 14 with the rotation of the photosensitive drum 26, and the charging roller 27 starts to be separated from the photosensitive drum 26. Then, when a timing T7 is reached, the charging roller 27 is separated to a predetermined distance, and the separation is completed. Thereafter, when a timing T8 is reached, the developing sleeve 71 rotates to a predetermined rotation angle, and the driving of the motors 92a and 92b is stopped.

In such a manner, when the Oldham coupling 1 of the present embodiment is provided, the rotation of the developing sleeve 71 in the opposite direction with the rotation driving of the motors 92a and 92b in the opposite direction to the rotational direction at the time of image forming, and the separation operation of the charging roller 27 from the photosensitive drum 26 can be executed at different timings. Namely, when the motor rotates in the opposite direction to the rotational direction at the time of image forming, only the developing sleeve 71 can be rotated in the opposite direction to the rotational direction at the time of image forming without separating the charging roller 27 from the photosensitive drum 26.

Accordingly, a defect occurring when the separation operation of the charging roller 27 and the reverse rotation of the developing sleeve 71 are performed at the same time can be suppressed. For example, when the image forming apparatus continuously executes an image forming process on recording materials, a reverse rotational operation of the developing sleeve 71 is executed whenever an image forming operation is performed on 500 A4 sheets; however, since the image forming process is continuously executed, the separation operation of the charging roller 27 from the photosensitive drum 26 is not required. Therefore, the Oldham coupling 1 of the present embodiment is provided, so that only the developing sleeve 71 can be rotated in the opposite direction to the rotational direction at the time of image forming without separating the charging roller 27 from the photosensitive drum 26. Hence, an unnecessary separation operation of the charging roller 27 can be suppressed.

In addition, since the Oldham coupling 1 of the present embodiment is provided, a defect caused by the reverse rotational operation of the separating members 32 and the developing sleeve 71 by the same amount can be suppressed. For example, when the separation operation of the charging roller 27 is started at the same timing as the reverse rotation of the developing sleeve 71, and the rotational operation of the separating members 32 is ended according to the ending of the reverse rotational operation of the developing sleeve 71, a malfunction occurring when the separating members 32 come into contact with the drum container 11 can be suppressed. In addition, when the separation operation of the charging roller 27 is started at the same timing as the reverse rotation of the developing sleeve 71, and the reverse rotation of the developing sleeve 71 is ended according to the ending of the separation operation of the charging roller 27, an insufficiency in the amount of push of the toner deposited in the space to the stirring chamber 80 side can be suppressed, the space being surrounded by the developing sleeve 71, the squeeze sheets 77, and the developing blade 72.

Second Embodiment

Next, a second embodiment of an Oldham coupling according to the present invention will be described with reference to the drawings. Portions duplicated as those described in the first embodiment are denoted by the same reference signs, and a description thereof will be omitted.

A configuration of the Oldham coupling 1 according to the present embodiment is different from the configuration of the first embodiment in the shape of the protruded portion 99a of the developing drive gear 99 and the shape of the protruded portion 89a of the drive coupling 89. Other configurations are the same as configurations of the first embodiment including an overall configuration of the image forming apparatus A.

Figure 14:
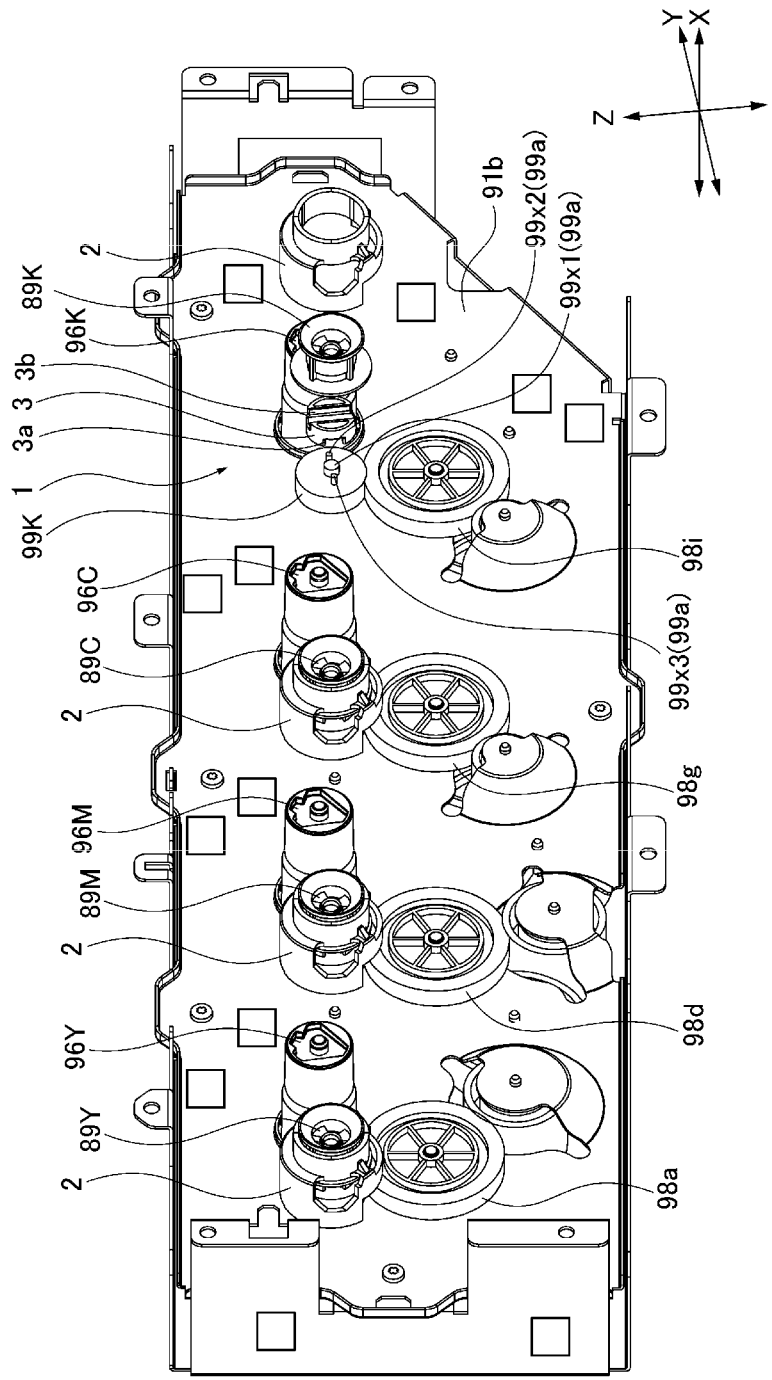
FIG. 14 is an exploded perspective view of an Oldham coupling.
Figure 15:
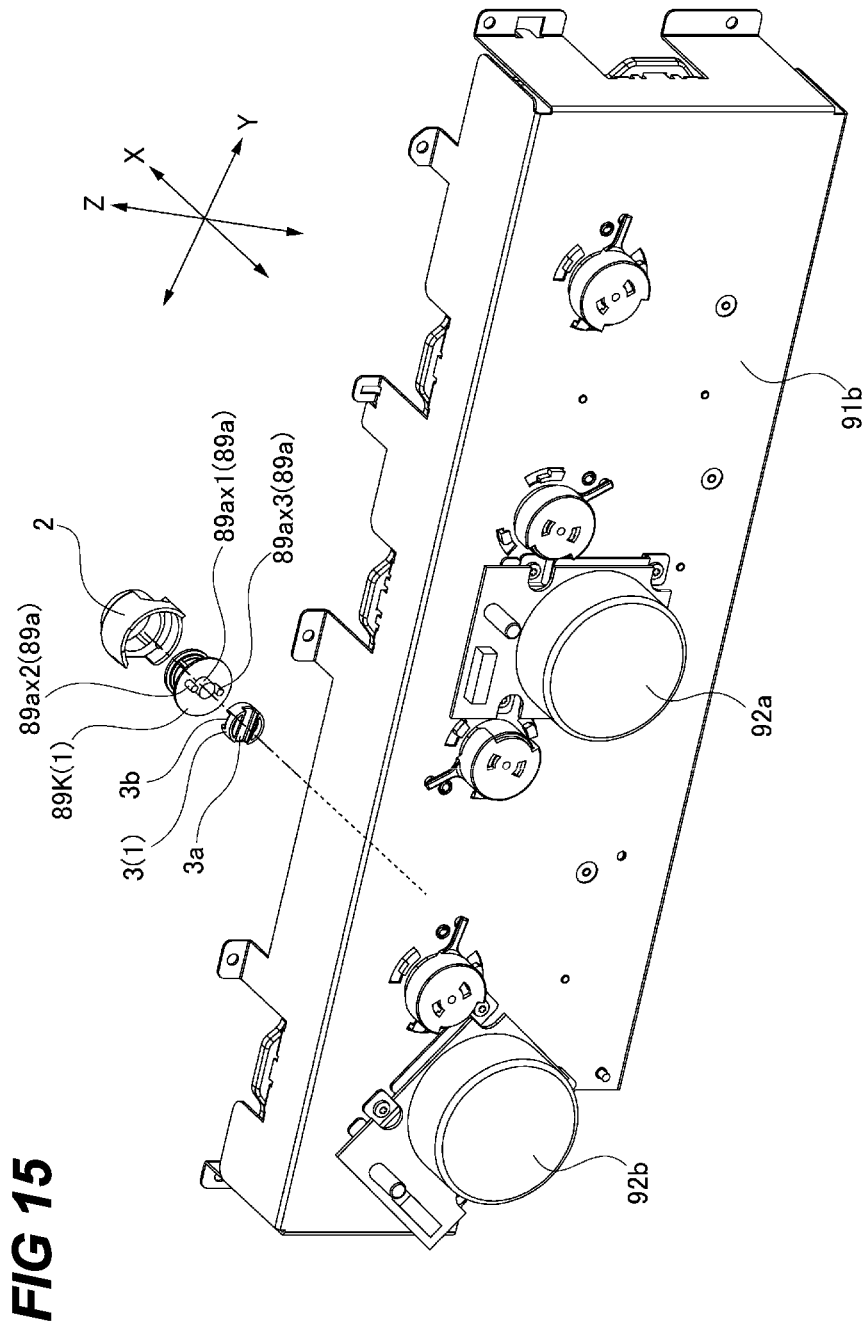
FIG. 15 is an exploded perspective view of the Oldham coupling.
Figure 16A:
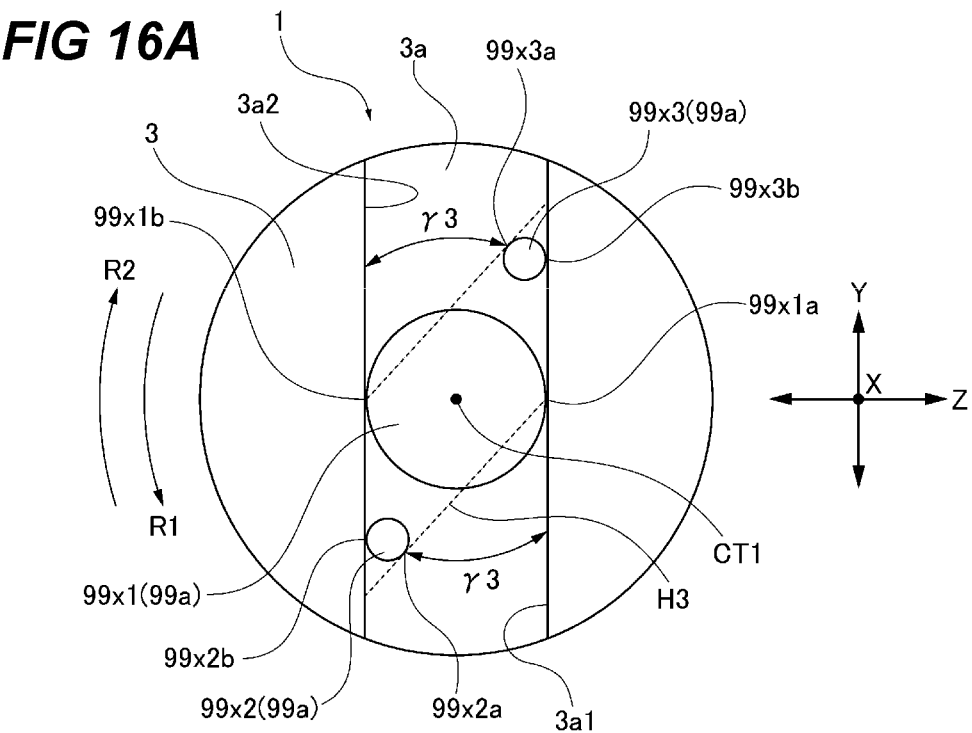
FIGS. 16A and 16B are views illustrating fitting portions between a developing drive gear, an intermediate member, and a drive coupling of the Oldham coupling.
Figure 16B:
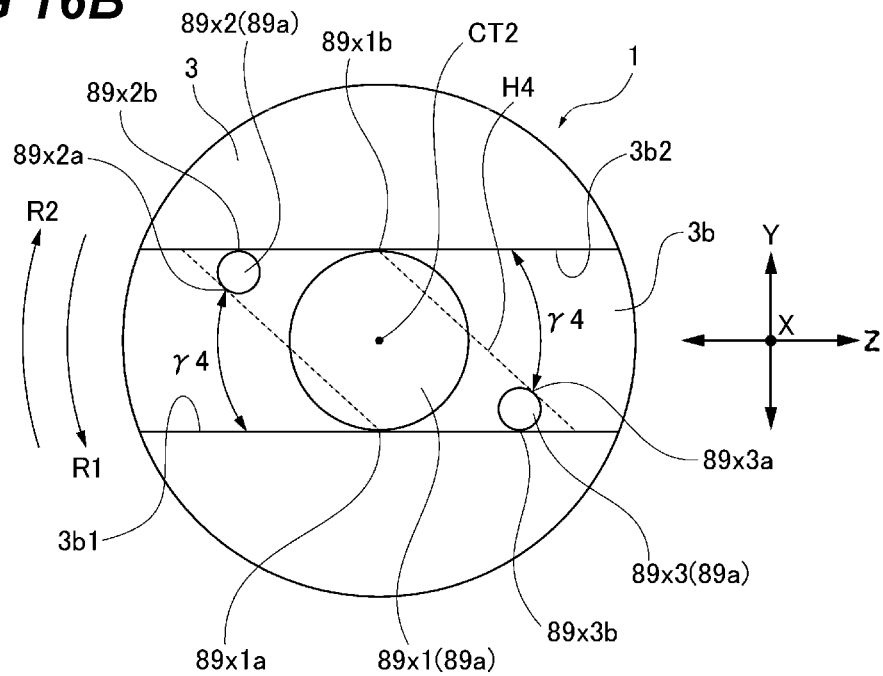

FIG. 14 is a perspective view of the Oldham coupling 1 according to the present embodiment as seen from the front side of the image forming apparatus A. FIG. 15 is a perspective view of the Oldham coupling 1 according to the present embodiment as seen from the back side of the image forming apparatus A. FIG. 16A is a view illustrating a fitting portion between the developing drive gear 99 and the intermediate member 3 of the Oldham coupling 1. FIG. 16B is a view illustrating a fitting portion between the drive coupling 89 and the intermediate member 3 of the Oldham coupling 1.

As illustrated in FIGS. 14 and 15, the protruded portion 99a of the developing drive gear 99 according to the present embodiment includes a cylindrical portion 99x1 and cylindrical portions 99x2 and 99x3 having a smaller diameter than the diameter of the cylindrical portion 99x1. The cylindrical portion 99x2 and the cylindrical portion 99x3 have the same shape, and a distance between the cylindrical portion 99x2 and the cylindrical portion 99x1 and a distance between the cylindrical portion 99x3 and the cylindrical portion 99x1 are also set to be the same.

In addition, the protruded portion 89a of the drive coupling 89 includes a cylindrical portion 89x1 and cylindrical portions 89x2 and 89x3 having a smaller diameter than the diameter of the cylindrical portion 89x1. The cylindrical portion 89x2 and the cylindrical portion 89x3 have the same shape, and a distance between the cylindrical portion 89x2 and the cylindrical portion 89x1 and a distance between the cylindrical portion 89x3 and the cylindrical portion 89x1 are also set to be the same.

When the developing drive gear 99 is rotated by a driving force of the motor 92a or the motor 92b, the protruded portion 99a of the developing drive gear 99 comes into contact with inner walls of the recessed portion 3a while moving in a sliding manner relative to the inside of the recessed portion 3a, and transmits the driving force to the intermediate member 3, so that the intermediate member 3 rotates. Then, when the intermediate member 3 rotates, inner walls of the recessed portion 3b come into contact with the protruded portion 89a of the drive coupling 89 while the protruded portion 89a moves in a sliding manner relative to the inside of the recessed portion 3b, and transmit the driving force to the drive coupling 89, so that the drive coupling 89 rotates. In such a manner, even when the rotational axis of the rotational shaft (not illustrated) of the developing drive gear 99 and the rotational axis of the rotational shaft 100 of the developing coupling 75 are misaligned from each other, a driving force of the motor 92a or the motor 92b is to be stably transmitted to the rotational shaft 100 of the developing coupling 75 via the Oldham coupling 1.

Here, as illustrated in FIG. 16A, the cylindrical portion 99x1 includes an edge portion 99x1a (first edge portion) that comes into contact with the one inner wall 3a1 (first inner wall) of the recessed portion 3a in the width direction and an edge portion 99x1b (second edge portion) that comes into contact with the other inner wall 3a2 (second inner wall) when the Oldham coupling 1 rotates in the arrow R1 direction (first rotational direction). In addition, the cylindrical portion 99x2 includes an edge portion 99x2a (first edge portion) that comes into contact with the inner wall 3a1 of the recessed portion 3a when the Oldham coupling 1 rotates in the arrow R1 direction. In addition, the cylindrical portion 99x3 includes an edge portion 99x3a (second edge portion) that comes into contact with the inner wall 3a2 of the recessed portion 3a when the Oldham coupling 1 rotates in the arrow R1 direction. The edge portions 99x1a, 99x1b, 99x2a, and 99x3a come into line contact with the inner wall 3a1 or the inner wall 3a2 of the recessed portion 3a by way of a line extending in the rotational axis direction of the Oldham coupling 1.

In addition, the cylindrical portion 99x1 includes the edge portion 99x1a (third edge portion) that comes into contact with the inner wall 3a1 of the recessed portion 3a and the edge portion 99x1b (fourth edge portion) that comes into contact with the inner wall 3a2 when the Oldham coupling 1 rotates in the arrow R2 direction (second rotational direction). In addition, the cylindrical portion 99x2 includes an edge portion 99x2b (third edge portion) that comes into contact with the inner wall 3a1 of the recessed portion 3a when the Oldham coupling 1 rotates in the arrow R2 direction. In addition, the cylindrical portion 99x3 includes an edge portion 99x3b (fourth edge portion) that comes into contact with the inner wall 3a2 of the recessed portion 3a when the Oldham coupling 1 rotates in the arrow R2 direction. The edge portions 99x1a, 99x1b, 99x2b, and 99x3b come into line contact with the inner wall 3a1 or the inner wall 3a2 of the recessed portion 3a by way of a line extending in the rotational axis direction of the Oldham coupling 1.

Here, when the Oldham coupling 1 rotates in the arrow R2 direction, the edge portion 99x2a of the cylindrical portion 99x2 is to be located closer to the inner wall 3a2 than the rotation center CT1 (first rotation center) of the developing drive gear 99 in the arrow Z direction. The edge portion 99x2a of the cylindrical portion 99x2 is a portion that is farthest from the rotation center CT1 of the developing drive gear 99 in the arrow Y direction, among edge portions that come into contact with the inner wall 3a1 of the recessed portion 3a when the Oldham coupling 1 rotates in the arrow R1 direction.

In addition, when the Oldham coupling 1 rotates in the arrow R2 direction, the edge portion 99x3a of the cylindrical portion 99x3 is to be located closer to the inner wall 3a1 than the rotation center CT1 of the developing drive gear 99 in the arrow Z direction. The edge portion 99x3a of the cylindrical portion 99x3 is a portion that is farthest from the rotation center CT1 of the developing drive gear 99 in the arrow Y direction, among edge portions that come into contact with the inner wall 3a2 of the recessed portion 3a when the Oldham coupling 1 rotates in the arrow R1 direction.

In addition, when the Oldham coupling 1 rotates in the arrow R1 direction, the edge portion 99x2b of the cylindrical portion 99x2 is to be located closer to the inner wall 3a1 than the rotation center CT1 of the developing drive gear 99 in the arrow Z direction. The edge portion 99x2b of the cylindrical portion 99x2 is a portion that is farthest from the rotation center CT1 of the developing drive gear 99 in the arrow Y direction, among edge portions that come into contact with the inner wall 3a2 of the recessed portion 3a when the Oldham coupling 1 rotates in the arrow R2 direction.

In addition, when the Oldham coupling 1 rotates in the arrow R1 direction, the edge portion 99x3b of the cylindrical portion 99x3 is to be located closer to the inner wall 3a2 than the rotation center CT1 of the developing drive gear 99 in the arrow Z direction. The edge portion 99x3b of the cylindrical portion 99x3 is a portion that is farthest from the rotation center CT1 of the developing drive gear 99 in the arrow Y direction, among edge portions that come into contact with the inner wall 3a1 of the recessed portion 3a when the Oldham coupling 1 rotates in the arrow R2 direction.

In addition, when seen in the rotational axis direction of the Oldham coupling 1, the protruded portion 99a has a substantially rhombic shape formed by a virtual line H3 connecting the edge portions 99x1a, 99x1b, 99x2a, 99x2b, 99x3a, and 99x3b. Specifically, a rhombic shape is formed in which when a corner is formed by both lines obtained by extending a virtual line connecting the edge portion 99x1a and the edge portion 99x2a and a virtual line connecting the edge portion 99x1b and the edge portion 99x2b, the angle of the corner is 45 degrees, and when a corner is formed by both lines obtained by extending a virtual line connecting the edge portion 99x1a and the edge portion 99x3b and a virtual line connecting the edge portion 99x1b and the edge portion 99x3a, the angle of the corner is 45 degrees. The substantially rhombic shape may be configured to have the above-described corners or may be a shape in which the above-described corners are chamfered.

With such a configuration, when the Oldham coupling 1 rotates in the arrow R2 direction, a play γ3 is to be formed between the edge portion 99x2a and the inner wall 3a1 of the recessed portion 3a and between the edge portion 99x3a and the inner wall 3a2 of the recessed portion 3a. In addition, when the Oldham coupling 1 rotates in the arrow R1 direction, the same play γ3 is to be formed between the edge portion 99x2b and the inner wall 3a2 of the recessed portion 3a and between the edge portion 99x3b and the inner wall 3a1 of the recessed portion 3a.

In addition, as illustrated in FIG. 16B, the cylindrical portion 89x1 includes an edge portion 89x1a (fifth edge portion) that comes into contact with the one inner wall 3b1 (third inner wall) of the recessed portion 3b in the width direction and an edge portion 89x1b (sixth edge portion) that comes into contact with the other inner wall 3b2 (fourth inner wall) when the Oldham coupling 1 rotates in the arrow R1 direction. In addition, the cylindrical portion 89x2 includes an edge portion 89x2a (fifth edge portion) that comes into contact with the inner wall 3b1 of the recessed portion 3b when the Oldham coupling 1 rotates in the arrow R1 direction. In addition, the cylindrical portion 89x3 includes an edge portion 89x3a (sixth edge portion) that comes into contact with the inner wall 3b2 of the recessed portion 3b when the Oldham coupling 1 rotates in the arrow R1 direction. The edge portions 89x1a, 89x1b, 89x2a, and 89x3a come into line contact with the inner wall 3b1 or the inner wall 3b2 of the recessed portion 3b by way of a line extending in the rotational axis direction of the Oldham coupling 1.

In addition, the cylindrical portion 89x1 includes the edge portion 89x1a (fifth edge portion) that comes into contact with the inner wall 3b1 of the recessed portion 3b and the edge portion 89x1b (sixth edge portion) that comes into contact with the inner wall 3b2 when the Oldham coupling 1 rotates in the arrow R2 direction. In addition, the cylindrical portion 89x2 includes an edge portion 89x2b (fifth edge portion) that comes into contact with the inner wall 3b1 of the recessed portion 3b when the Oldham coupling 1 rotates in the arrow R2 direction. In addition, the cylindrical portion 89x3 includes an edge portion 89x3b (sixth edge portion) that comes into contact with the inner wall 3b2 of the recessed portion 3b when the Oldham coupling 1 rotates in the arrow R2 direction. The edge portions 89x1a, 89x1b, 89x2b, and 89x3b come into line contact with the inner wall 3b1 or the inner wall 3b2 of the recessed portion 3b by way of a line extending in the rotational axis direction of the Oldham coupling 1.

Here, when the Oldham coupling 1 rotates in the arrow R2 direction, the edge portion 89x2a of the cylindrical portion 89x2 is to be located closer to the inner wall 3b2 than the rotation center CT2 (second rotation center) of the drive coupling 89 in the arrow Y direction. The edge portion 89x2a of the cylindrical portion 89x2 is a portion that is farthest from the rotation center CT2 of the drive coupling 89 in the arrow Z direction, among edge portions that come into contact with the inner wall 3b1 of the recessed portion 3b when the Oldham coupling 1 rotates in the arrow R1 direction.

In addition, when the Oldham coupling 1 rotates in the arrow R2 direction, the edge portion 89x3a of the cylindrical portion 89x3 is to be located closer to the inner wall 3b1 than the rotation center CT2 of the drive coupling 89 in the arrow Y direction. The edge portion 89x3a of the cylindrical portion 89x3 is a portion that is farthest from the rotation center CT2 of the drive coupling 89 in the arrow Z direction, among edge portions that come into contact with the inner wall 3b2 of the recessed portion 3b when the Oldham coupling 1 rotates in the arrow R1 direction.

In addition, when the Oldham coupling 1 rotates in the arrow R1 direction, the edge portion 89x2b of the cylindrical portion 89x2 is to be located closer to the inner wall 3b1 than the rotation center CT2 of the drive coupling 89 in the arrow Y direction. The edge portion 89x2b of the cylindrical portion 89x2 is a portion that is farthest from the rotation center CT2 of the drive coupling 89 in the arrow Z direction, among edge portions that come into contact with the inner wall 3b2 of the recessed portion 3b when the Oldham coupling 1 rotates in the arrow R2 direction.

In addition, when the Oldham coupling 1 rotates in the arrow R1 direction, the edge portion 89x3b of the cylindrical portion 89x3 is to be located closer to the inner wall 3b2 than the rotation center CT2 of the drive coupling 89 in the arrow Y direction. The edge portion 89x3b of the cylindrical portion 89x3 is a portion that is farthest from the rotation center CT2 of the drive coupling 89 in the arrow Z direction, among edge portions that come into contact with the inner wall 3b1 of the recessed portion 3b when the Oldham coupling 1 rotates in the arrow R2 direction.

In addition, when seen in the rotational axis direction of the Oldham coupling 1, the protruded portion 89a has a substantially rhombic shape formed by a virtual line H4 connecting the edge portions 89x1a, 89x1b, 89x2a, 89x2b, 89x3a, and 89x3b. Specifically, a rhombic shape is formed in which when a corner is formed by both lines obtained by extending a virtual line connecting the edge portion 89x1a and the edge portion 89x2a and a virtual line connecting the edge portion 89x1b and the edge portion 89x2b, the angle of the corner is 45 degrees, and when a corner is formed by both lines obtained by extending a virtual line connecting the edge portion 89x1a and the edge portion 89x3b and a virtual line connecting the edge portion 89x1b and the edge portion 89x3a, the angle of the corner is 45 degrees. The substantially rhombic shape may be configured to have the above-described corners or may be a shape in which the above-described corners are chamfered.

With such a configuration, when the Oldham coupling 1 rotates in the arrow R2 direction, a play γ4 is to be formed between the edge portion 89x2a and the inner wall 3b1 of the recessed portion 3b and between the edge portion 89x3a and the inner wall 3b2 of the recessed portion 3b. In addition, when the Oldham coupling 1 rotates in the arrow R1 direction, the same play γ4 is to be formed between the edge portion 89x2b and the inner wall 3b2 of the recessed portion 3b and between the edge portion 89x3b and the inner wall 3b1 of the recessed portion 3b.

In such a manner, according to the present embodiment, in the Oldham coupling 1, a driving force can be transmitted while the play γ3 in the rotational direction is provided between the developing drive gear 99 and the intermediate member 3 and the play γ4 in the rotational direction is provided between the drive coupling 89 and the intermediate member 3. In addition, a driving force can be selectively transmitted to a drive target depending on whether the motor rotates positively or the motor rotates reversely, and a driving force can be transmitted even in a state where rotational axes of two rotational shafts are misaligned from each other.

In the first and second embodiments, in the drive unit 90, the configuration has been described in which the Oldham coupling 1 is provided in a drive train that transmits a driving force to the developing sleeve 71, but the present invention is not limited to the configuration. Namely, the same effects can be obtained even with a configuration in which the Oldham coupling 1 is provided in another portion that transmits a driving force, such as in a drive train that transmits a driving force to the photosensitive drum 26.

In addition, in the first and second embodiments, in the drive unit 90, both the photosensitive drum 26 and the developing sleeve 71 are configured to be rotatable in the opposite direction of the rotational direction at the time of image forming, but a configuration may be employed in which only one of the photosensitive drum 26 and the developing sleeve 71 is to be rotated in the opposite direction of the rotational direction at the time of image forming. In this case, when the Oldham coupling 1 described above is provided, the amount of rotation of one of the photosensitive drum 26 and the developing sleeve 71 in the opposite direction can be increased. Accordingly, a driving force can be selectively transmitted to a drive target depending on whether the motor rotates positively or the motor rotates reversely, and a driving force can be transmitted even in a state where rotational axes of two rotational shafts are misaligned from each other.

In addition, in apparatuses other than the image forming apparatus, the same effects can be obtained even with a configuration in which the Oldham coupling 1 is provided as a portion that transmits a driving force from a drive source to a unit that is a target.

In addition, in the first and second embodiments, in the Oldham coupling 1, the configuration has been described in which both the protruded portion 99*a* of the developing drive gear 99 and the protruded portion 89*a* of the drive coupling 89 have a substantially rhombic shape, but the present invention is not limited to the configuration. Namely, one of the protruded portion 99*a* of the developing drive gear 99 and the protruded portion 89*a* of the drive coupling 89 may have substantially the same rectangular shape as that of the recessed portion 3*a* or the recessed portion 3*b* of the intermediate member 3. Namely, a configuration may be employed in which only one of the play γ1 between the developing drive gear 99 and the intermediate member 3 and the play γ2 between the drive coupling 89 and the intermediate member 3 is provided. In addition, the rotation angles of the plays γ1 to γ4 are not limited to the angles described in the first and second embodiments, and can be set to any angles.

In addition, in the first and second embodiments, in the Oldham coupling 1, the configuration has been described in which the protruded portions 99*a* and 89*a* are provided in the developing drive gear 99 and the drive coupling 89, respectively, and the recessed portions 3*a* and 3*b* are provided in the intermediate member 3, but the present invention is not limited to the configuration.

Namely, the same effects can be obtained even with a configuration in which one end portion and the other end portion of the intermediate member 3 in the rotational axis direction of the Oldham coupling 1 are provided with protruded portions corresponding to the protruded portions 99*a* and 89*a*, and the developing drive gear 99 and the drive coupling 89 are provided with recessed portions that are fitted to the protruded portions of the intermediate member 3.

According to the present invention, the Oldham coupling having a play in the rotational direction and being capable of transmitting a driving force can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-206318, filed Dec. 11, 2020, No. 2021-169591, filed Oct. 15, 2021, which is hereby incorporated by reference herein in its entirety.

What is claimed is:
1. An Oldham coupling comprising:
a first hub;
a second hub;
an intermediate member configured to transmit a driving force at positioned between the first hub and the second hub;
a recessed portion provided in one of an end surface of the first hub in a rotational axis direction of the Oldham coupling and an end surface of the intermediate member in a rotational axis direction of the Oldham coupling, being recessed in the rotational axis direction, and extending in a first direction orthogonal to the rotational axis direction, and the recessed portion includes a first inner wall on one side in a second direction orthogonal to the rotational axis direction and to the first direction, and a second inner wall provided on the other side in the second direction and extending parallel to the first inner wall,
a protruded portion provided in the other of the end surface of the first hub in a rotational axis direction of the Oldham coupling and the end surface of the intermediate member in a rotational axis direction of the Oldham coupling, the protruded portion protruding in the rotational axis direction, being fitted to the recessed portion, and configured to transmit a driving force between the intermediate member and the first hub, and the protruded portion includes
a first edge portion configured to contact with the first inner wall in a state the Oldham coupling rotates in a first rotational direction,
a second edge portion configured to contact with the second inner wall in a state the Oldham coupling rotates in the first rotational direction,
a third edge portion configured to contact with the first inner wall in a state the Oldham coupling rotates in a second rotational direction opposite to the first rotational direction, and
a fourth edge portion configured to contact with the second inner wall in a state the Oldham coupling rotates in the second rotational direction,
wherein in a state the first edge portion is in contact with the first inner wall and the second edge portion is in contact with the second inner wall, the third edge portion is separated from the first inner wall and the fourth edge portion is separated from the second inner wall,
wherein in a state the third edge portion is in contact with the first inner wall and the fourth edge portion is in contact with the second inner wall, the first edge portion is separated from the first inner wall and the second edge portion is separated from the second inner wall, wherein in a state the Oldham coupling rotates with rotation of a motor in the second rotational direction, a portion of the first edge portion that is farthest from a first rotation center that is a rotation center of the first hub in the first direction is to be located closer to the second inner wall than the first rotation center in the second direction, and a portion of the second edge portion that is farthest from the first rotation center in the first direction is to be located closer to the first inner wall than the first rotation center in the second direction, and wherein in a state the Oldham coupling rotates with rotation of the motor in the first rotational direction, a portion of the third edge portion that is farthest from the first rotation center in the first direction is to be located closer to the second inner wall than the first rotation center in the second direction, and a portion of the fourth edge portion that is farthest from the first rotation center in the first direction is to be located closer to the first inner wall than the first rotation center in the second direction.

2. The Oldham coupling according to claim 1, wherein in a state seen in the rotational axis direction, the protruded portion has a substantially rhombic shape formed by a virtual line connecting the first edge portion, the second edge portion, the third edge portion, and the fourth edge portion.

3. The Oldham coupling according to claim 1, wherein in the protruded portion, the first edge portion and the third edge portion come into surface contact with the first inner wall by way of surfaces extending in the rotational axis direction and in the first direction, and the second edge portion and the fourth edge portion come into surface contact with the second inner wall by way of surfaces extending in the rotational axis direction and in the first direction.

4. The Oldham coupling according to claim 1, wherein in the protruded portion, the first edge portion and the third edge portion come into line contact with the first inner wall by way of a line extending in the rotational axis direction, and the second edge portion and the fourth edge portion come into line contact with the second inner wall by way of a line extending in the rotational axis direction.

5. The Oldham coupling according to claim 1,
wherein the recessed portion is a first recessed portion, and the protruded portion is a first protruded portion,
wherein one of the intermediate member and the second hub is provided with a second recessed portion formed in an end surface in the rotational axis direction, being recessed in the rotational axis direction, and extending in the second direction, and the second recessed portion includes a third inner wall on one side in the first direction, and a fourth inner wall provided on the other side in the first direction and extending parallel to the first inner wall,
the other of the intermediate member and the second hub is provided with a second protruded portion protruding in the rotational axis direction, the second protruded portion is fitted to the second recessed portion configured to transmit a driving force between the intermediate member and the second hub, and the second protruded portion includes a fifth edge portion configured to come into contact with the third inner wall in a state the Oldham coupling rotates with rotation of the motor in the first rotational direction, a sixth edge portion configured to come into contact with the fourth inner wall in a state the Oldham coupling rotates with rotation of the motor in the first rotational direction, a seventh edge portion configured to come into contact with the third inner wall in a state the Oldham coupling rotates with rotation of the motor in the second rotational direction, and an eighth edge portion configured to come into contact with the fourth inner wall in a state the Oldham coupling rotates with rotation of the motor in the second rotational direction, in a state the fifth edge portion is in contact with the third inner wall and the sixth edge portion is in contact with the fourth inner wall, the seventh edge portion is separated from the third inner wall and the eighth edge portion is separated from the fourth inner wall, in a state the seventh edge portion is in contact with the third inner wall and the eighth edge portion is in contact with the fourth inner wall, the fifth edge portion is separated from the third inner wall and the sixth edge portion is separated from the fourth inner wall, in a state the Oldham coupling rotates with rotation of the motor in the second rotational direction, a portion of the fifth edge portion that is farthest from a second rotation center that is a rotation center of the second hub in the second direction is to be located closer to the fourth inner wall than the second rotation center in the first direction, and a portion of the sixth edge portion that is farthest from the second rotation center in the second direction is to be located closer to the third inner wall than the second rotation center in the first direction, and in a state the Oldham coupling rotates with rotation of the motor in the first rotational direction, a portion of the seventh edge portion that is farthest from the second rotation center in the second direction is to be located closer to the fourth inner wall than the second rotation center in the first direction, and a portion of the eighth edge portion that is farthest from the second rotation center in the second direction is to be located closer to the third inner wall than the second rotation center in the first direction.

6. The Oldham coupling according to claim 5, wherein in a state seen in the rotational axis direction, the second protruded portion has a substantially rhombic shape formed by a virtual line connecting the fifth edge portion, the sixth edge portion, the seventh edge portion, and the eighth edge portion.

7. The Oldham coupling according to claim 5, wherein in the second protruded portion, the fifth edge portion and the seventh edge portion come into surface contact with the third inner wall by way of surfaces extending in the rotational axis direction and in the second direction, and the sixth edge portion and the eighth edge portion come into surface contact with the fourth inner wall by way of surfaces extending in the rotational axis direction and in the second direction.

8. The Oldham coupling according to claim 5, wherein in the second protruded portion, the fifth edge portion and the seventh edge portion come into line contact with the third inner wall by way of a line extending in the rotational axis direction, and the sixth edge portion and the eighth edge portion come into line contact with the fourth inner wall by way of a line extending in the rotational axis direction.

9. An image forming apparatus comprising:
a motor;
the Oldham coupling according to claim 1; and
an image forming unit to be driven by a driving force of the motor transmitted via the Oldham coupling to form an image on a sheet.

10. The image forming apparatus according to claim 9, wherein the image forming unit includes a photosensitive member, and a developer carrier configured to carry a developer and causes the developer to adhere to a surface of the photosensitive member, and
the developer carrier is to be rotated by the driving force of the motor transmitted via the Oldham coupling.

11. The image forming apparatus according to claim 10, wherein the photosensitive member is to be rotated by the driving force of the motor.

12. The image forming apparatus according to claim 11, wherein the image forming unit is configured to be detachably attachable to the image forming apparatus.

13. The image forming apparatus according to claim 10, wherein the image forming unit is configured to be detachably attachable to the image forming apparatus.

14. The image forming apparatus according to claim 9, wherein the image forming unit is configured to be detachably attachable to the image forming apparatus.

* * * * *